US008702321B2

(12) United States Patent
Marple et al.

(10) Patent No.: US 8,702,321 B2
(45) Date of Patent: Apr. 22, 2014

(54) FILTERED FIBER OPTIC PROBE

(76) Inventors: Eric T. Marple, Loxahatchee, FL (US);
Kirk D. Urmey, West Milton, OH (US)

( * ) Notice: Subject to any disclaimer, the term of this patent is extended or adjusted under 35 U.S.C. 154(b) by 122 days.

(21) Appl. No.: 13/465,847

(22) Filed: May 7, 2012

(65) Prior Publication Data
US 2012/0236303 A1    Sep. 20, 2012

Related U.S. Application Data

(63) Continuation-in-part of application No. 12/630,640, filed on Dec. 3, 2009, now Pat. No. 8,175,423.

(51) Int. Cl.
G02B 6/36    (2006.01)
G02B 6/00    (2006.01)
G02B 6/32    (2006.01)

(52) U.S. Cl.
USPC ................................ 385/79; 385/12; 385/33

(58) Field of Classification Search
USPC .............................................. 385/33–35, 79
See application file for complete search history.

(56) References Cited

U.S. PATENT DOCUMENTS

| 4,573,761 | A | | 3/1986 | McLachlan et al. |
|---|---|---|---|---|
| 5,112,127 | A | | 5/1992 | Carrabba et al. |
| 5,293,872 | A | | 3/1994 | Alfano et al. |
| 5,335,067 | A | * | 8/1994 | Prather et al. ................ 356/436 |
| 5,402,508 | A | | 3/1995 | O'Rourke et al. |
| 5,583,051 | A | * | 12/1996 | Ekechukwu ................ 436/169 |
| 5,751,416 | A | | 5/1998 | Singh et al. |
| 5,774,610 | A | | 6/1998 | O'Rourke et al. |
| 5,911,017 | A | | 6/1999 | Wach et al. |
| 6,028,666 | A | | 2/2000 | Boss et al. |
| 6,088,166 | A | | 7/2000 | Lee |
| 6,172,817 | B1 | | 1/2001 | Senapati et al. |
| 6,208,783 | B1 | | 3/2001 | Wach |
| 6,208,887 | B1 | | 3/2001 | Clarke |
| 6,222,970 | B1 | | 4/2001 | Wach et al. |
| H002002 | H | | 11/2001 | McLachlan |
| 6,690,966 | B1 | | 2/2004 | Rava et al. |
| 6,737,649 | B2 | | 5/2004 | Webster |
| 6,762,835 | B2 | | 7/2004 | Zhang et al. |
| 6,762,841 | B1 | * | 7/2004 | Bragg et al. ................ 356/436 |
| 6,847,491 | B1 | * | 1/2005 | Jian et al. ................ 359/642 |
| 7,394,537 | B1 | | 7/2008 | Lindfors et al. |
| 7,482,296 | B2 | | 1/2009 | Messerschmidt et al. |
| 7,499,153 | B2 | | 3/2009 | Puppels et al. |
| 7,499,161 | B2 | * | 3/2009 | Richards-Kortum et al. 356/317 |
| 7,647,092 | B2 | | 1/2010 | Motz et al. |
| 7,714,998 | B2 | | 5/2010 | Furman et al. |
| 8,175,423 | B2 | * | 5/2012 | Marple ................ 385/12 |

(Continued)

OTHER PUBLICATIONS

Santos et al., *Fiber-Optic Probes for In Vivo Raman Spectroscopy in the High-Wavenumber Region*, Anal. Chem. 2005, 77, 6747-6752.

(Continued)

*Primary Examiner* — Rhonda Peace
(74) *Attorney, Agent, or Firm* — Paul Diamond, Esq.; Diamond Law Office, LLC

(57) ABSTRACT

The invention provides improved multi-fiber, fiber optic probe assemblies in which the component parts are adapted for rapid assembly with precise alignment. Some embodiments are adapted to illuminate and collect light from a sample at a particular depth while minimizing interference arising from within the probe assembly itself. Also provided are methods for manufacturing the probe assemblies and optical apparatuses including the probe assemblies.

20 Claims, 19 Drawing Sheets

(56) References Cited

U.S. PATENT DOCUMENTS

| | | | |
|---|---|---|---|
| 8,278,615 B2* | 10/2012 | Igarashi et al. | 250/216 |
| 8,432,542 B2* | 4/2013 | Marple et al. | 356/301 |
| 2003/0191398 A1 | 10/2003 | Motz et al. | |
| 2004/0073120 A1 | 4/2004 | Motz et al. | |
| 2004/0081397 A1 | 4/2004 | Liu | |
| 2004/0267110 A1 | 12/2004 | Tremble | |
| 2006/0139633 A1 | 6/2006 | Puppels et al. | |
| 2007/0038120 A1* | 2/2007 | Richards-Kortum et al. | 600/476 |
| 2009/0231578 A1 | 9/2009 | Ling et al. | |
| 2009/0302205 A9 | 12/2009 | OLSEN et al. | |
| 2009/0323076 A1 | 12/2009 | Li et al. | |
| 2011/0135244 A1* | 6/2011 | Marple | 385/12 |
| 2012/0176613 A1* | 7/2012 | Marple et al. | 356/301 |
| 2012/0236303 A1* | 9/2012 | Marple et al. | 356/301 |
| 2013/0279852 A1* | 10/2013 | Chang et al. | 385/33 |

OTHER PUBLICATIONS

Utzinger et al., *Fiber optic probes for biomedical optical spectroscopy*, Journal of Biomedical Optics 8(1), 121-147, Jan. 2003.

Reed et al., *Gradient-index fiber-optic microprobes for minimally invasive in vivo low-coherence interferometry*, Optics Letters vol. 27, No. 20, 1794-1796, Oct. 15, 2002.

Ansari et al., *Compact, Non-Contact Fiber-Optic Probe for Diagnosis of Eye Diseases*, NASA Tech Briefs, Feb. 1998, vol. 22, No. 2, p. 82.

\* cited by examiner

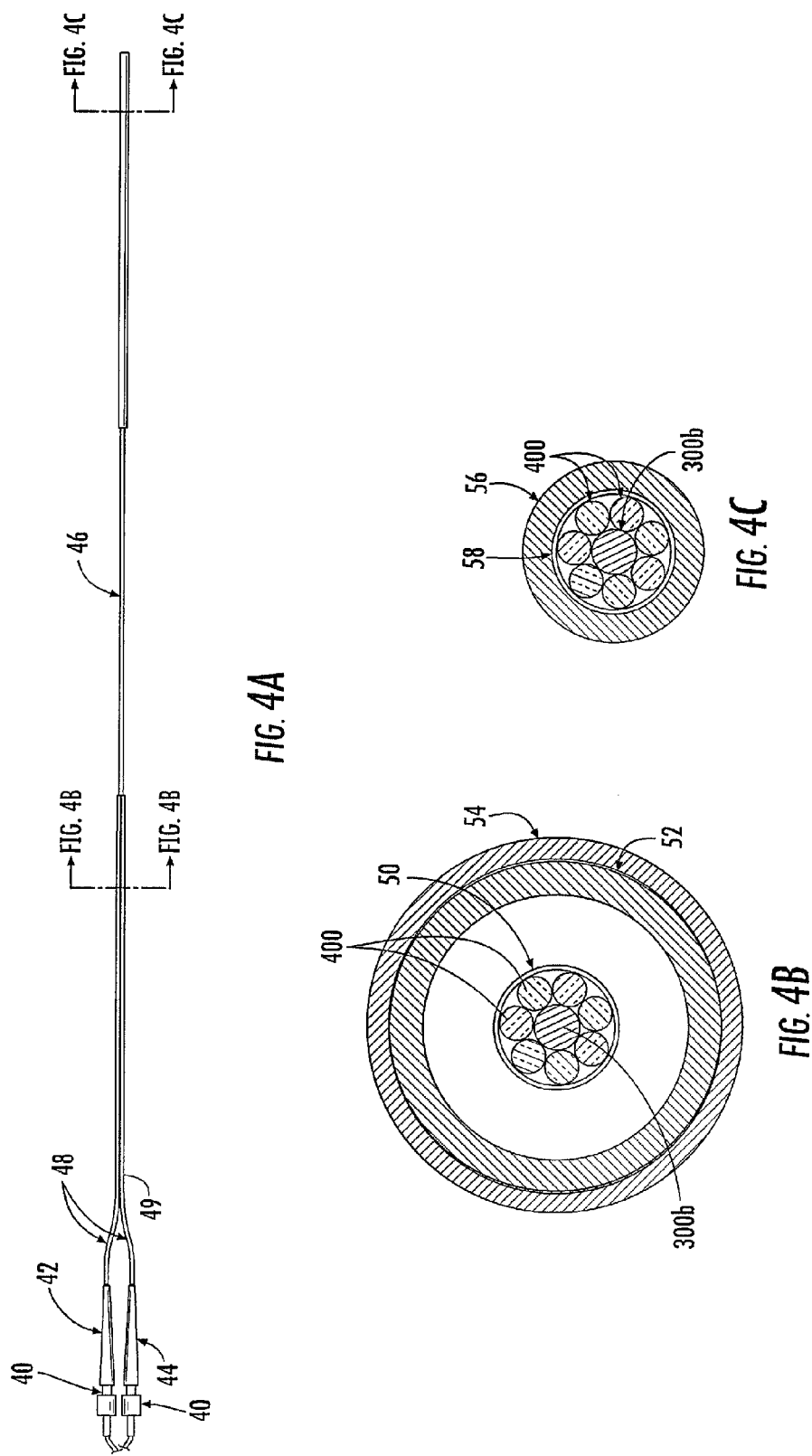

FILTERED FIBER OPTIC PROBE

CROSS-REFERENCE TO RELATED APPLICATIONS

This application is a continuation-in-part of U.S. application Ser. No. 12/630,640 filed Dec. 3, 2009 now U.S. Pat. No. 8,175,423 which is hereby incorporated by reference in its entirety.

FIELD OF THE INVENTION

This invention relates to the design and construction of filtered fiber optic Raman probes, particularly to fiber optic probes which are designed about a series of graduated cylindrical annular members which enable uniform and repetitive construction and assembly which results in a high degree of quality control.

BACKGROUND OF THE INVENTION

Light-scattering spectroscopy entails illumination of a substance and analyzing light that is scattered at angles relative to the incident source. The photon-matter interactions of the scattering events may be either elastic or inelastic. In an inelastic event, a photon's energy (wavelength) changes as a result of the light-matter interaction. In an elastic event, a photon's energy (wavelength) does not change. Absorption, the phenomena in which a fraction of photons are entirely absorbed, also plays a role in light-scattering spectroscopies.

Raman, diffuse reflectance, and fluorescence spectroscopies are of particular interest as they relate to vibrational and nonvibrational photonic responses of a material. The Raman effect describes a subtle light-matter interaction. Minute fractions of light illuminating a substance are Raman-scattered in random directions. Raman-scattered light is color shifted from the incident beam (usually a laser). The color frequency shifts are highly specific as they relate to molecular bond vibrations inducing molecular polarizability changes. Raman spectroscopy is a powerful technique for chemical analysis and monitoring. Analysis of the resulting low light levels require sophisticated, expensive instrumentation and technical complexity.

Specular reflectance relates to a surface's mirror-like aspects. Diffuse reflectance relates to light that is elastically scattered from the surface of a material at diffuse angles relative to the incident beam. For example, a projector screen diffusely reflects light while a glossy, newly waxed car has a high specular component. Diffuse reflectance spectroscopy is important for chemical analysis as well as measuring visual perception.

Fluorescence relates to substances which absorb light at one wavelength then re-emit it at a longer wavelength as a result of electronic transitions. As an example, a "highlighter" felt-tip marker appears to "glow" green as it absorbs blue and ultraviolet light then emits it as green. Fluorescence provides a powerful technique for chemical monitoring.

Raman spectroscopy involves energizing a sample with a high-power, narrow-wavelength energy source, such as a laser. The laser photons induce low intensity light emissions as wavelengths shift. The Raman effect is an inelastic scattering of photons. The emitted Raman light is collected and analyzed with a specialized instrument.

The spectral positions (colors) of the shifts provide fingerprints of the chemicals in the sample. Thus, Raman spectroscopy provides a means for chemical identification. The intensity of the shift (the spectral peak height) correlates to chemical concentration. Thus, a properly calibrated instrument provides chemical content and concentration. In practicality, Raman spectroscopy is technically complex and requires sophisticated, expensive instrumentation.

The basic concept for a probe-based, on-line Raman instrument is simple. Laser light is directed down an optical fiber to a remote probe. The laser light exits the fiber and illuminates the sample medium. Another fiber picks up the Raman-emitted light and returns it to the instrument for analysis. Optical aspects of probe engineering have historically required particular design finesse. The Raman effect involves very weak signals. Raman emissions may be one trillionth as intense as the exciting radiation. Subsequently, the probe must be incredibly efficient in collecting and transmitting Raman-emitted light. Furthermore, the signal must not be corrupted by extraneous influences.

A band-pass (laser line) filter may be used at the delivery end of a light delivery optical fiber to remove the silica Raman bands arising from the fiber itself before illuminating a sample. A long-pass filter may be disposed before a collection fiber so that only the Stokes scattered light enters the fiber. Filtering for optical fiber-based Raman spectroscopy is described, for example in U.S. Statutory Invention Registration No. H002002. In order to make a filtered probe of the style depicted (not using expanded beam optics), typically each fiber is filtered individually. As disclosed in U.S. Pat. No. 6,222,970, this is generally accomplished by depositing a filter on the fiber end face and butting this filter to another fiber using a tube or coupler to join/align the two fibers. Subsequently, the filtered collection fibers and filtered excitation fiber are epoxied together and placed inside a larger tube, epoxied in place, and then polished so the end face is an optical finish. Alternatively, this can also be accomplished by placing the filter on a glass (fused silica) substrate, machining it to a small circle and placing it between the fibers, as taught in U.S. Pat. No. 5,774,610, and completing as described above.

Since the filters are positioned back from the tip itself this necessitates that the rigid section of the probe be long which limits its usefulness for many applications (such as endoscopic applications), and the complexity of the probe manufacturing process is high, since the more collection fibers used the more time is required to make each filtered fiber. The diameter also becomes larger since each fiber needs a connecting tube, so the size grows with each filtered fiber. If smaller fibers are used they become even more difficult to handle and construct if attempting to make a very small diameter probe. If the filter is deposited on the end face of the fibers and the filter is at the end of the probe the filter can be scratched easily, and aligning all the filtered fibers so the end is smooth and uniform is very difficult and time consuming, because one cannot polish the end since the filters would be removed.

PRIOR ART

U.S. Pat. No. 5,402,508 to O'Rourke, et al teaches a fiber optic probe having fibers with endfaces formed for improved coupling efficiency and a method of using same. A fiber optic probe is taught for detecting scattered light, with transmitting and receiving fibers having slanted ends and bundled together to form a bevel within the tip of the probe. The probe comprises a housing with a transparent window across its tip for protecting the transmitting and receiving fibers held therein. The endfaces of the fibers are slanted, by cutting, polishing and the like, so that they lie in a plane that is not perpendicular to the longitudinal axis of the respective fiber. The fibers are held in the tip of the probe using an epoxy and oriented so that lines normal to the slanted endfaces are divergent with respect to one another. The epoxy, which is positioned substantially between the transmitting and receiving fibers, is tapered so that the transmitting fiber, the epoxy and the receiving fiber form a bevel of not more than 20 degrees. The angled fiber endfaces cause directing of the light cones toward each other, resulting in improved light coupling efficiency. A light absorber, such as carbon black, is contained in the epoxy to reduce crosstalk between the transmitting and receiving fibers.

U.S. Pat. No. 5,112,127 to Carrabba, et al. teaches a fiber-optic probe which is useful for measuring Raman spectra of samples remote from the light source and detector. The probe head contains optical components which selectively remove unwanted fluorescence and Raman scattering arising from the interaction between the Raman excitation source radiation and the input optical fiber. The optics also filter the Raman excitation source into a return optical fiber leading to a spectrometer or detector. In one embodiment, the disposition of optical components provides a compact probe geometry with parallel input and output fibers at one end and a sampling port at the other end. An encasement for the optics is also disclosed, for sealing the components against the environment, and for coupling the probe to specialized sampling attachments, such as for conducting Surface Enhanced Raman Spectroscopy.

U.S. Pat. No. 6,208,783 to Wach, is directed toward an optical filtering device for filtering light propagating within waveguides, including optical fibers. The device includes an optical filter, a first waveguide section and a second waveguide section positioned between the filter and the first waveguide section. The diameter of the second waveguide section is greater on the end proximate to the optical filter than on the end opposite the optical filter, typically tapering from one end of the second waveguide section to the other. The benefits of this device include reduction of power density, collimation of light for filtering and/or facilitation of optical coupling, and robustness.

U.S. Pat. No. 6,737,649 to Webster is directed toward a fiber optic probe, designed to be inserted into a particulate sample, which is formed from distal ends of transmitting and receiving optic fibers. The distal ends of the transmitting fibers are located centrally in the probe and the distal ends of the receiving fibers are formed in a ring around the distal ends of the transmitting fibers. The distal ends of the receiving fibers are set back from the distal ends of the transmitting fibers. The receiving fibers carrying diffusely scattered light reflected from and transmitted through the particulate sample to a spectrophotometer housing containing fixed grating and an array of silicon photodetectors arranged to detect the spectrum dispersed by the grating in the range of 500 to 1100 nm.

U.S. Pat. No. 7,499,153 to Puppels discloses a fiber optic probe, wherein the fiber optic probe comprises one or more optical fibers for directing laser light onto the tissue and for collecting light that is scattered by the tissue and guiding the collected light away from the tissue towards the signal detection unit, wherein the fiber or fibers for collecting light have substantially no Raman signal in one or more parts of the 2500-3700 $cm^{-1}$ spectral region, and wherein the detection unit records the Raman signal scattered by the tissue in said spectral region. This type of probe with no filtering and using a single fiber is generally only useful for the high wavenumber region of Raman spectroscopy (which is not as specific as the fingerprint region of Raman spectroscopy), since the silica Raman produced by the fiber itself will, in most cases, tend to dominate the fingerprint region, thereby reducing its usefulness. The invention enables ex vivo, in vitro and in vivo analysis and diagnosis of atherosclerotic plaque and detection of tumor tissue with great advantages over current state-of-the-art technology.

The prior art fails to teach or suggest optical probe assemblies as illustrated by the present invention, nor a process for manufacture and assembly thereof.

SUMMARY OF THE INVENTION

In accordance with the present invention a Raman optical probe is produced by preparing an assembly which comprises a central tube surrounded by the collection fibers, which assembly is formed by use of epoxy or the like and polished. This readily enables the use of any size fiber, since problems with fiber alignment, which for years have plagued most methods of probe manufacture, are not an issue with this design. Even in the case where the fibers are of a very small diameter, the ultimate epoxied assembly is larger and therefore easier to work with. The center excitation fiber, positioned within a needle tube (typically a nitinol tubing that may be center less ground) can be inserted inside this main tube. A band pass filter is thinned to a thickness which allows the use of a small diameter excitation fiber. As the laser beam expands after it exits the fiber end face it travels through the filter substrate, preferably a fused silica, and if the thickness of the filter is chosen properly the beam will be the same diameter as the band pass filter has been machined to. The nitinol tube provides an excellent laser shield, so crosstalk of reflected laser light off the surface of the band pass filter substrate is stopped before it can make it to the collection fibers or long pass filter. In addition, having some type of needle tube, illustrated by, but not limited to a nitinol needle tube around the excitation fiber insures that if the band pass filter has any chipping or cracks on the outside edges of the filter from the machining process, these flaws will be over the needle tube and not over the fiber. These imperfections would affect the filter performance if they were above the excitation fiber and the probe would not perform as well as it could. Alternatively, this problem could be addressed by use of a fiber with a wide cladding, so the chipping would be over the cladding.

The main tube also helps in that a donut filter is formed so as to lay directly on top of this, so if the filter has any chipping or cracks on the edge of the center hole of the donut filter from machining, these imperfections will be above the tube not above the collection fibers. These imperfections would affect the filter performance if above the collection fibers and the probe would not perform optimally.

Normally, one would want the collection fibers to be as close to the excitation fiber as possible. Any gap between the fibers will normally reduce the performance of the probe. This is true for probes in which the fibers end faces stop at the same position (a standard old designed probe), but in the instantly disclosed design, the collection fibers are recessed back from the end face of the excitation assembly. This allows the collection beam of the collection fiber to expand through the donut filter, and this collection cone can collect Raman scattered light directly from the side of the excitation assembly. This construction enables an individual collection fiber to collect a similar amount of Raman light as compared to more conventional designs, even though it is not in intimate contact with the excitation assembly. This configuration also enables the use of a greater number of collection fibers surrounding the excitation. The thickness of the donut filter can be chosen and machined to whatever thickness is best for the particular diameter of the main tube, and thereby maximize the performance of the probe.

This design also facilitates the use of very small collection fibers. This is very important since the fibers entering the spectrograph must be stacked one on top of each other into a line, and the width of this line affects the resolution of the spectrograph. Normally a fixed slit of 50 or 100 microns is placed at the entrance of the spectrograph to control this. If the fibers are large in relation to this slit, say a 300 micron core, the majority of the light collected is wasted or thrown away since it never really enters the spectrograph. The instantly disclosed design allows easy use of these small fibers since they are epoxied together around the main tube and handled as one assembly which the filter is placed upon. Utilizing small fibers also has advantages in flexibility, and smaller bend radii which enables usefulness in more applications such as endoscopic and catheter based measurements. Prior art designs required the technician to handle each fiber alone which is tremendously difficult and time consuming, and the ability to keep each fiber clean prior to assembly is problematic. Since every design will utilize a greater number of small diameter fibers than large diameter fibers, this has historically been a large problem in prior art designs.

Accordingly, it is a primary objective of the instant invention to provide fiber optic probes which incorporate a series of graduated shaped and nestable members, e.g. cylindrical annular members which enable uniform and repetitive construction and assembly of the probes resulting in a high degree of quality control.

It is a further objective of the invention to provide an alternative construction wherein the collection fibers follow a shaped machined tip which enables the user to collect a signal from very close to the excitation laser or delivery element.

It is yet an additional objective to provide an alternative embodiment which uses one or more lenses or other optical devices to alter the way the light is collected or altered.

It is a still further objective to provide a process for fiber optic assembly which provides a series of graduated shaped and nestable members, e.g. cylindrical annular members to insure uniform and repetitive alignment and fiber positioning, thereby substantially eliminating misalignment and resulting in a high degree of quality control.

One front-lensed embodiment of the invention fiber optic probe assembly having a distal sampling end, a proximal end, a light delivery path therethrough and a light collection path therethrough, said probe including:

(a) a converging lens, such as a single converging lens, disposed at or near the distal sampling end of the probe, said converging lens having a distal end, a proximal end, a central axis, a length, a transverse dimension and a focal length;

(b) at least one collection optical fiber, such as one or more than one such as a plurality, having a distal end, a proximal end, a central axis and a transverse dimension, the proximal end of the converging lens in optical communication with the distal end of the at least one collection optical fiber, the central axis of the at least one collection optical fiber at its distal end being parallel to the central axis of the converging lens, and the transverse dimension of the at least one collection optical fiber at its distal end being within the footprint of the converging lens;

(c) at least one light delivery optical fiber, such as one or more than one such as a plurality, having a distal end, a proximal end and a central axis, its central axis at its distal end being parallel to the central axis of the converging lens and its transverse dimension at its distal end being within the footprint of the converging lens; and (d) optionally, an optical window having a proximal end face, a distal end face and a length, the proximal end face of the optical window in optical communication with, such as in juxtaposed relationship with, the distal end of the converging lens, wherein the proximal-distal orientation of the converging lens, the at least one collection optical fiber, the light delivery optical fiber, the probe assembly and optical window if present are codirectional, wherein the collection optical fiber and the light delivery optical fiber are disposed (positioned) in a side-by-side relationship at their distal ends, wherein the converging lens, the at least one collection optical fiber, the at least one light delivery optical fiber are mutually sized and configured such that the light delivery path and the light collection path are at least substantially not intersecting, such as not intersection at all, in the converging lens;

wherein the converging lens, the at least one collection optical fiber, the at least one light delivery optical fiber, and optical window if present are mutually configured such that the light delivery path and light collection path are at least substantially intersecting distally beyond, such as just distally beyond, the distal end of the probe assembly, for example within 100 microns, within 200 microns, within 300 microns, or within 400 microns just distally beyond the distal end of the probe assembly. The distal end of the probe assembly may for example be the distal end surface of the converging lens if no optical window is present or could be the distal surface of the optical window if it is present.

The converging lens may be a convex lens having a convex surface. For example, the converging lens may be single convex lens (a plano convex lens), having a convex face and a flat face, the single convex lens oriented in the assembly such that its convex face is in optical communication with and faces such as juxtaposed with the distal ends of the light delivery optical fiber and the light collection optical fiber and the flat face of the single convex lens faces in the distal direction.

The probe assembly may further include an alignment barrel having a proximal end and a distal end, a longitudinal dimension, a transverse dimension, and at least two longitudinal holes having parallel central axes passing therethrough, wherein the distal end portion of at least one light collection optical fiber is disposed within one of the longitudinal holes, wherein the distal end portion of at least one light delivery optical fiber is disposed within one of the longitudinal holes, and wherein the central axes of the distal portions of the light collection optical fiber and the light delivery optical fiber are parallel to the central axes of the longitudinal holes in which they are disposed.

The probe assembly may include at least one filter selected from the group consisting of: a filter, such as a bandpass or shortpass filter, disposed between the distal end of at least one light delivery optical fiber and the converging lens; and a filter, such as a longpass or notch filter, disposed between the distal end of at least one light collection optical fiber and the converging lens.

The optical window may be formed of a different optical than the converging lens. The length of the optical window may be greater than the length of the converging lens.

A related front-lensed embodiment of the invention provides a fiber optic probe assembly having a distal sampling end, a proximal end, a light delivery path therethrough and a light collection path therethrough, said probe including:

(a) a plano convex converging lens formed of a first optical material and disposed at or near the distal sampling end of the probe, said converging lens having a distal end, a curved proximal end, a central axis, a length, a transverse dimension and a focal length;

(b) at least one collection optical fiber, such as one or more than one such as a plurality, having a distal end, a proximal end, a central axis and a transverse dimension, the proximal end of the converging lens in optical communication with the distal end of the at least one collection optical fiber, the central axis of the at least one collection optical fiber at its distal end being parallel to the central axis of the converging lens, and the transverse dimension of the at least one collection optical fiber at its distal end being within the footprint of the converging lens;

(c) at least one light delivery optical fiber, such as one or more than one such as a plurality, having a distal end, a proximal end and a central axis, its central axis at its distal end being parallel to the central axis of the converging lens and its transverse dimension at its distal end being within the footprint of the converging lens; and (d) an optical window formed of an optical material different than the first optical material, the optical window having a proximal end face, a distal end face and a length, the proximal end face of the optical window in juxtaposed relationship with the distal end of the converging lens and the length of the optical window greater than the length of the converging lens, wherein the proximal-distal orientation of the converging lens, the at least one collection optical fiber, the light delivery optical fiber, the probe assembly and optical window are codirectional, wherein the collection optical fiber and the light delivery optical fiber are disposed in a side-by-side relationship at their distal ends, wherein the converging lens, the at least one collection optical fiber, the at least one light delivery optical fiber are mutually sized and configured such that the light delivery path and the light collection path at least substantially do no intersect in the converging lens; and wherein the converging lens, the at least one collection optical fiber, the at least one light delivery optical fiber, and optical window are mutually configured such that the light delivery path and light collection path are at least substantially intersecting distally beyond the distal end of the optical window, such as within 100 microns, within 200 microns, within 300 microns or within 400 microns of the distal face of the optical window, for example, measured normally.

This embodiment may similarly include an alignment barrel as described for the prior embodiment. It may also include filters as described for the prior embodiment.

Still another embodiment of the invention provides an optical analysis apparatus that includes: any of the optical probe assemblies described herein; at least one light analyzer optically coupled to the proximal end of the light collection optical fiber; and at least one light source optically coupled to the proximal end of the light delivery optical fiber. The at least one light analyzer may include a Raman spectrometer and the light source may include a laser, for the performance of Raman spectroscopy. The apparatuses may be configured to perform more than spectroscopic technique using the probe assembly, for example, via a plurality of collection fibers and one or more light delivery fibers. In a variation of the apparatus, the laser produces light of a certain wavelength, the probe assembly comprises an optical window of a different material than the converging lens and the optical window material generates less background signal, such as Raman signal, in a region of interest (per unit quantity of material) in response to the light of the wavelength than the converging lens material does. The light delivery and light collection paths may intersect in the window (while not intersecting in the converging lens) since no significant background signal is generated in the window.

Other objects and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

BRIEF DESCRIPTION OF THE DRAWINGS

FIG. 4A illustrates a perspective view of a complete fiber optic probe;

FIG. 4B is a cross-sectional view of the fiber optic probe taken through section line B-B;

FIG. 4C is a cross-sectional view of the fiber optic probe taken through section line A-A;

DETAILED DESCRIPTION OF THE INVENTION

Figure 1A:
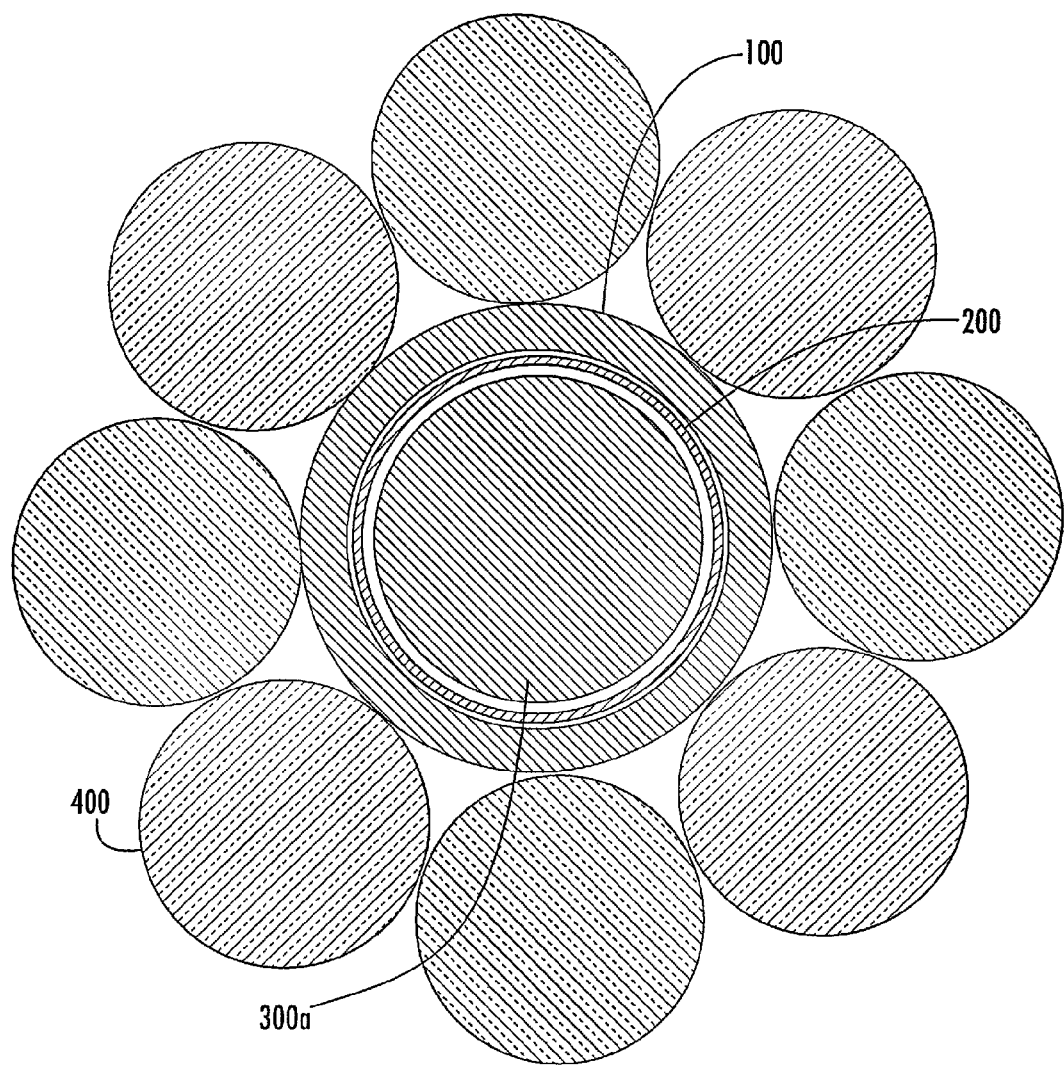
FIGS. 1A and 1B illustrate an end-view of a 9 around 1 design and a 30 around 1 design, respectively.

In accordance with the present invention, the term optical element(s) or collection element(s) is understood to include optical fibers, per se, along with assemblies which include various combinations of optical fibers, filters and lenses.

While the present invention is illustrated utilizing cylindrical tubes, fibers, and the like, it is nevertheless contemplated by this invention that the tubes, fibers, filters and the like could have other than a circular cross-section, e.g. they could be shaped in the form of a square, rectangle, or other polygonal shape, such that they are "nestable", meaning that they are capable of being assembled in equivalent nesting arrangements, defining annular "ring-like" spaces, albeit not necessarily round in cross-section.

In one embodiment of the instant invention a fiber optic probe assembly, useful in Raman spectroscopy, is described which comprises at least one excitation optical fiber, having a proximal end and a distal end, for transmitting light from a light source at the proximal end to a sample surface at the distal end. A plurality of collection optical fibers, each having a proximal end and a distal end, is also provided wherein the collection optical fibers are generally distributed circumferentially about the at least one excitation optical fiber, whereby the collection fibers are adapted to receive collected Raman scattered light from the surface, a first cylindrical annular member is provided having a proximal end and a distal end, an inner diameter and an outer diameter, wherein the inner diameter is sized and configured to receive therein the at least one excitation optical fiber, a band pass filter is provided having a proximal surface and a distal surface, wherein the excitation optical fiber distal end and the band pass filter proximal surface are in juxtaposed relationship, and a second cylindrical annular member is provided having a proximal end and a distal end, an inner diameter and an outer diameter, wherein the second cylindrical annular member inner diameter is sized and configured for receipt within the first cylindrical annular member outer diameter and the band pass filter, and a third cylindrical annular member is provided having a proximal end and a distal end, an inner diameter and an outer diameter, wherein the third cylindrical annular member is sized and configured to receive therein the second cylindrical annular member such that the third cylindrical annular member inner diameter is in juxtaposed and nesting relationship with the second cylindrical annular member outer diameter. In this configuration, the plurality of collection optical fibers are circumferentially distributed about and affixed to the outer diameter of the third cylindrical annular member. By "affixed to the outer diameter" is understood to mean affixed either directly or indirectly. For example in the 7 around 1 or 9 around 1 embodiments the fibers are directly affixed to the third cylindrical annular member, however in the 30 around 1 embodiment, some of the fibers are affixed to each other and are only indirectly affixed to the third cylindrical annular member. An annular long pass filter having a proximal surface and a distal surface, an inner diameter and an outer diameter is further provided wherein the annular long pass filter inner diameter is sized and configured for receipt about the second cylindrical annular member outer diameter and wherein the proximal surface of the long pass filter is in juxtaposed relationship with the distal ends of the plurality of collection optical fibers.

The following detailed description will refer to the associated figures.

Figure 1B:
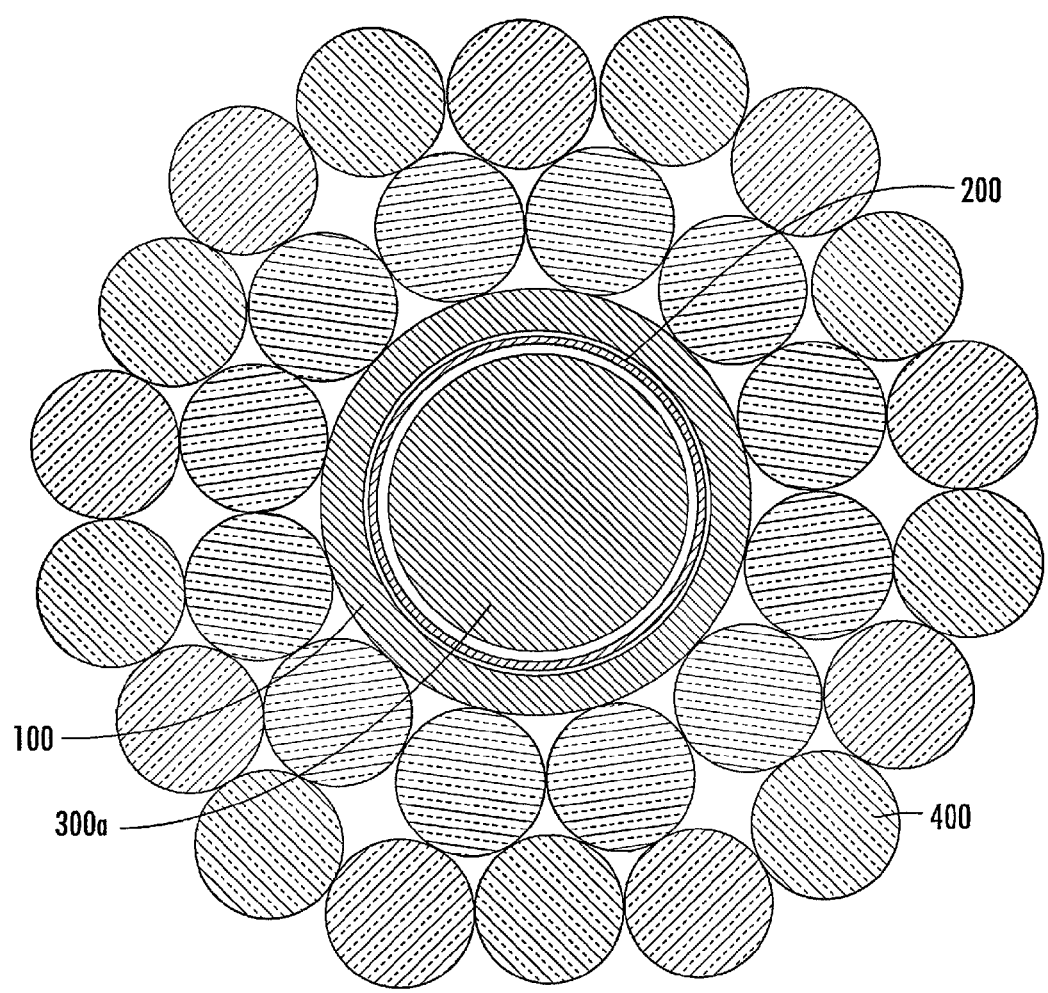

Referring to FIGS. 1A and 1B, end views of a 9 around 1 design and a 30 around 1 design, respectively, are illustrated. Utilizing low OH silica clad silica core optical fibers (Polymicro Technologies), one will first cut nine 300 micron core collection fibers 400 to a desired length for the probe. Next, the technician will remove the polyimide buffer, approximately ½ inch from end of the fiber, by any of the means suggested by Polymicro Technologies. The technician will then cut 23 ga extra thin wall stainless steel needle tube 100 to approximately ¾ inch in length. Next, the technician will place a small drop of epoxy on one end of needle tube and cure. One will then cut 24 ga Teflon heat shrink tubing to approximately 1.5 inches long and place the 9 fibers with polyimide removed inside the Teflon heat shrink. The technician will then place a 23 ga extra thin wall needle tube 100 in the middle of the 9 fibers, making sure that epoxy on the end is at the outside and even with the ends of the fibers. At this juncture care should be taken to insure that about ½ inch of heat shrink is sticking past the ends of the fibers/tube. The technician will then heat shrink the Teflon to pull all the fibers in intimate contact with the needle tube. Using a syringe epoxy is then injected inside the Teflon tubing and covers the fibers/tube. Care must be taken to not inject epoxy so that it goes beyond the end of the needle tube (so the tube end remains open). Next, is the step of curing the epoxy and removing the Teflon. The end of the fiber tube assembly can now be polished to a good quality optical finish, e.g. approximately a 1 micron polish film. Care should also be taken to be certain that the tube has been polished through the small drop of epoxy that was cured on the end initially (so the tube is open on both ends). Pushing a wire through the tube will insure it is open and clean.

Figure 2A:
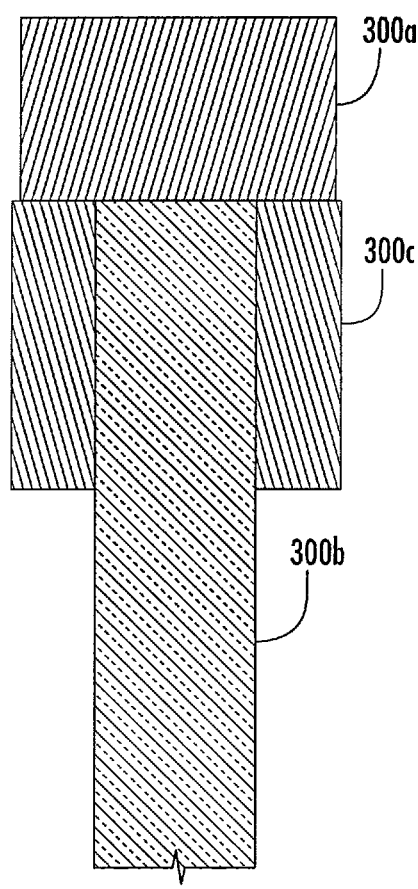
FIG. 2A illustrates a cross-sectional view of the excitation optical element sub-assembly.
Figure 2B:
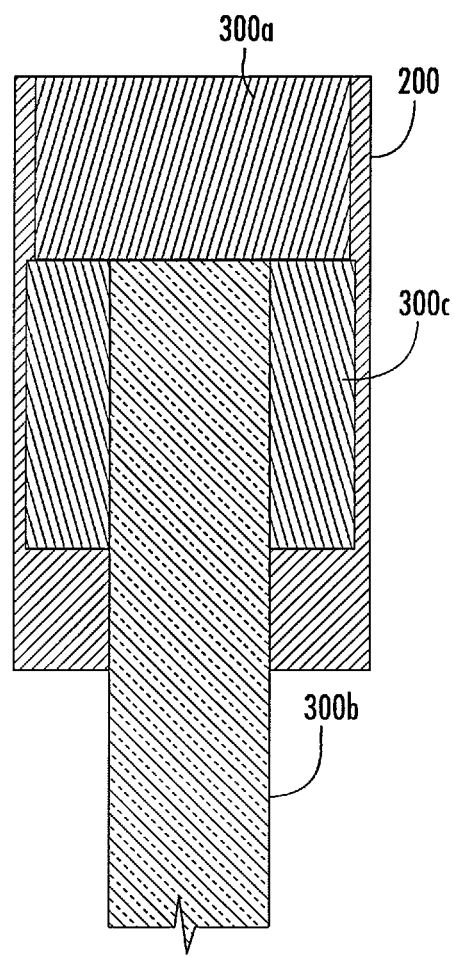
FIG. 2B is a cross-sectional view which further illustrates the excitation optical element sub-assembly positioned within the centerless ground nitinol tube.

Now referring to FIG. 2A, a cross-sectional view of the excitation optical fiber sub-assembly is illustrated, wherein the filtered laser fiber is made by first cutting a 200 micron core fiber 300B with the polyimide buffer (Polymicro Technologies) to the desired probe length. The fiber has about ¼ inch of the polyimide buffer removed. The fiber is epoxied into a 26 ga regular wall needle tube 300C cut to about ⅜ inch long. This needle tube with fiber inside is polished with a bare fiber adaptor. This polished fiber has an individual cleaned Band Pass filter 300A machined to a diameter of 0.018 inches placed on the end (filter side down, typically 200 to 400 microns thick) with an optical epoxy and cured. As illustrated in FIG. 2B the nitinol tube 200 that was center less ground to the dimensions 0.0185 inch ID, 0.0195 inch OD is cut to about ⅜ inch long and placed over the excitation optical fiber sub assembly with epoxy. The filter should be close to flush with the end of the nitinol tube, and the epoxy is cured. This filtered fiber assembly can be polished if desired to make sure the filter substrate and nitinol tube are flush.

Figure 2C:
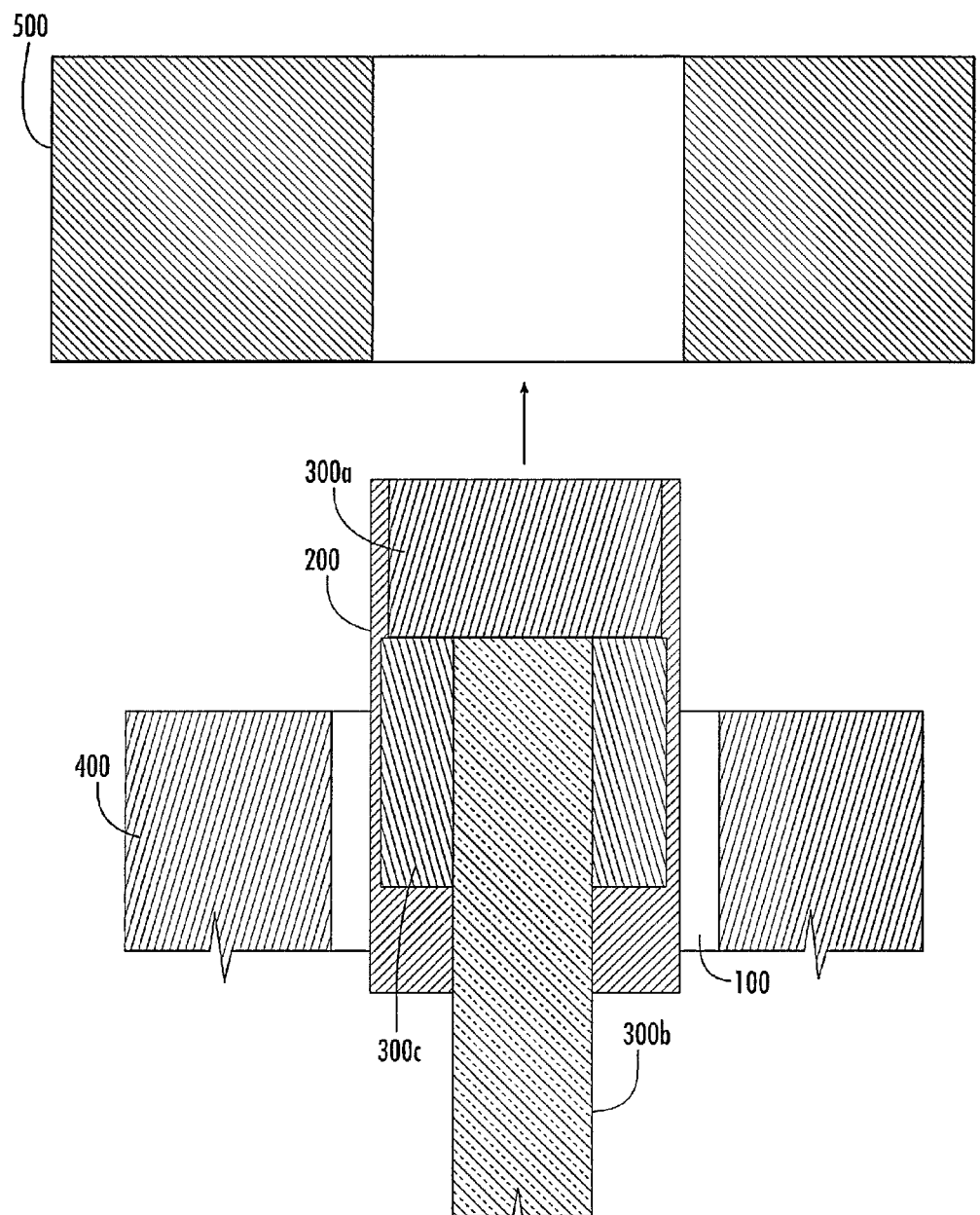
FIG. 2C is a cross-sectional view which further illustrates positioning of the long pass filter about the construction of FIG. 2B and illustrates positioning of the collection elements about a stainless steel tube.

With reference to FIG. 2C, the filtered fiber assembly is now placed inside the main tube 100 of the collection fiber assembly with optical epoxy.

Figure 2D:
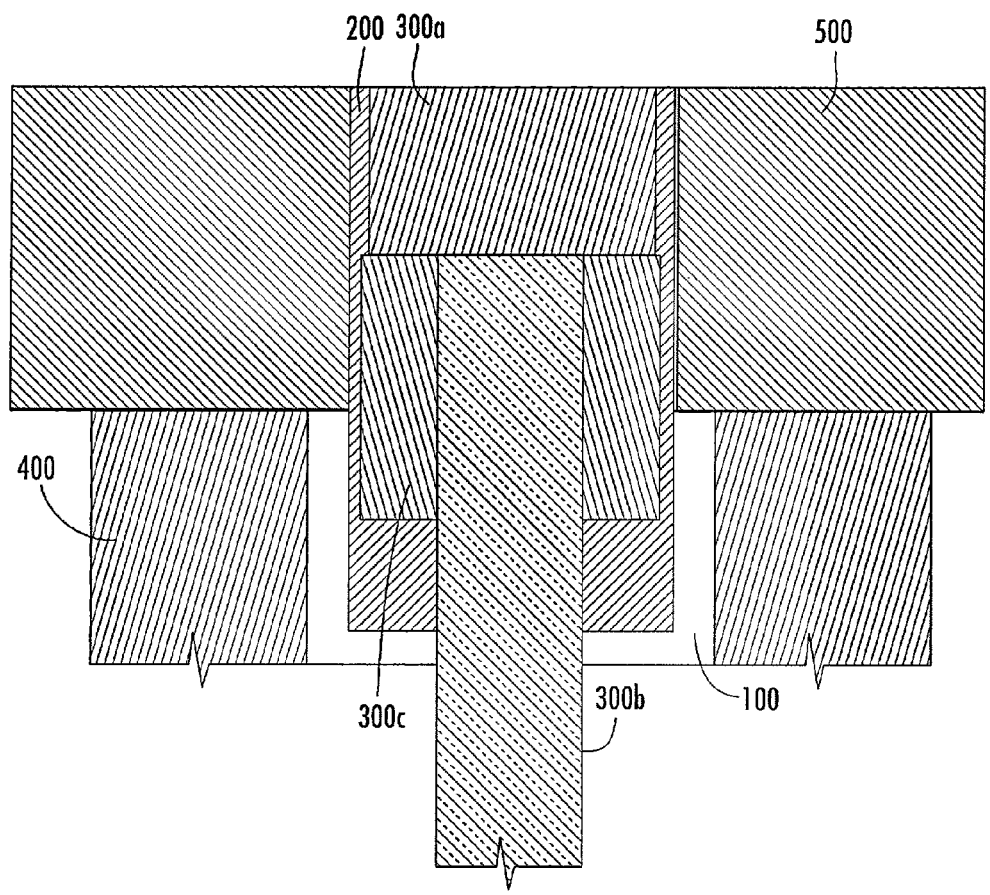
FIG. 2D is a cross-sectional view which illustrates final assembled positions of long and band pass filters in cooperation with excitation optical element sub-assembly and collection element sub-assembly.

As illustrated in FIG. 2D, the donut filter 500 machined with a 0.02 inch OD of the inner circle, 0.06 inch OD of the whole filter (filter side down, typically 250 microns to 500 microns thick) is now placed over this filtered fiber assembly. The filtered fiber assembly makes the donut go in the exact position desired. The optical epoxy will flow in between the donut (long pass filter) and the polished main tube and collection fibers end face. It is important to try to maintain the excitation filtered fiber assembly as close to being flush as possible with the surface of the donut or long pass filter. This entire assembly is cured, and a 14 ga needle tube (not shown) with epoxy is placed over the entire assembly and cured. The probe end can now be polished to insure the end face of the probe is flat and uniform.

Figure 3A:
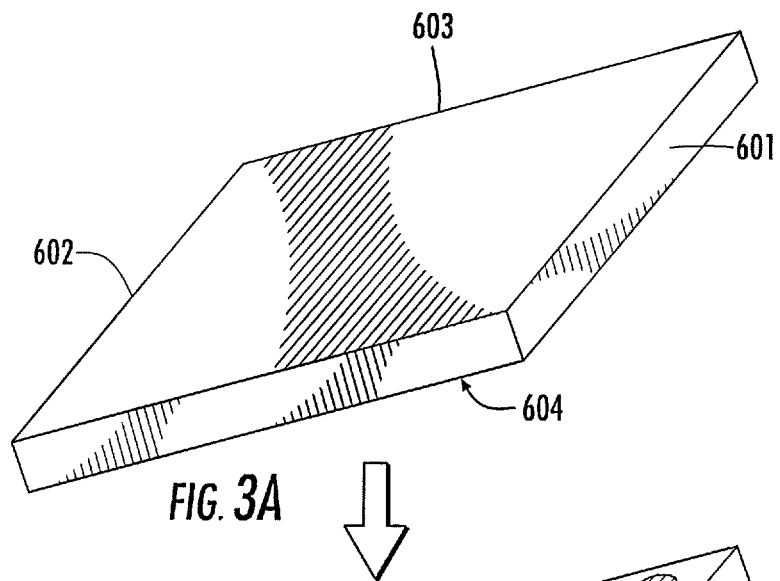
FIGS. 3A, 3B and 3C illustrate a stepwise procedure for filter manufacturing.
Figure 3B:
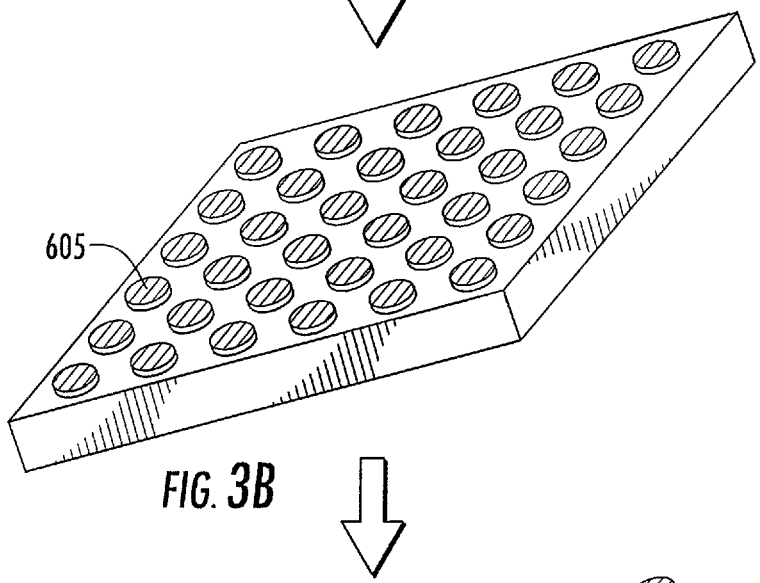
Figure 3C:
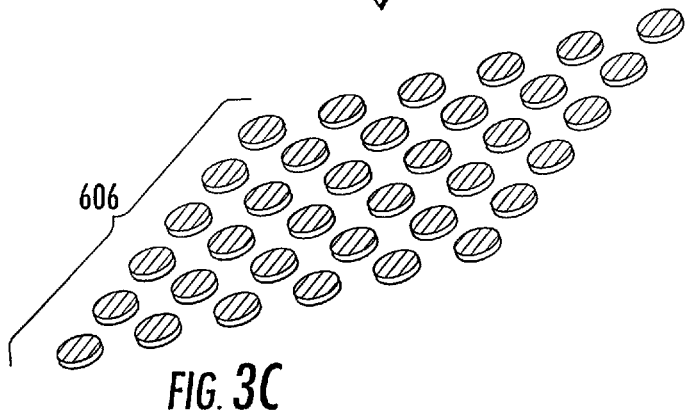

Referring now to FIGS. 3A-3C, an illustrative, albeit non-limiting example of a method of filter manufacture includes the steps of forming a filter coated substrate 604 by adhering a filter material 603 to a fused silica substrate 601 which is subsequently machined to have wells or cores 605 extending to a preselected depth through the filter and into the substrate. The shape of the wells defines the shape of the optical piece to be formed. In this illustration, circular band pass filters are formed, although the invention contemplates the utilization of any desired shape. The wells may, for example, be formed by machining of the substrate. Machining may be accomplished by standard methods such as the use of ceramic machining techniques, use of diamond tooling, and the like. It is further contemplated that laser machining under appropriate conditions could be used as well. Next, the machined filter is thinned by removing material from its back side (side opposite that having the well openings), for example, by polishing, to the level of the base of the machining wells, thereby releasing the multiple individual pieces 606. Multiple filters/coating types may also be formed. This methodology insures quality control of the filter run prior to machining. Both filters can be made using this methodology.

Now with reference to FIGS. 4A, 4B and 4C, an illustration of a complete fiber optic probe including the instantly disclosed construction is shown. FIG. 4A is a perspective view of a complete probe assembly, while FIGS. 4B and 4C are cross-sectional views taken along lines B-B and A-A respectively. Fiber connectors 40 are attached to both the excitation fiber 42 and collection fibers 44. A flexible polymer tubing 46 (many tubing types are suitable) can be placed over the bundle of fibers that come out from the back of the 14 ga needle tube 56 to protect the fibers. A breakout or "y" 49 is used to separate the excitation fiber from the collection fibers, and a pair of polymer tubes 48 are provided, one of which is placed over the excitation fiber, and the other of which is placed over the collection fibers. Standard or custom connectors 40 can be used to terminate the excitation fiber and collection fibers. All the polymer tubes and connectors are epoxied and cured. The terminations are then polished.

With reference to the cross-sectional views, FIG. 4B illustrates the excitation fiber 300B and collection fibers 400 covered or surrounded by a polymer tube 50, and surrounded by an 8 ga stainless steel tube 52 about which is a heat shrinkable tube 54. FIG. 4C more specifically illustrates the terminal end of the probe wherein a 14 ga tube 56 surrounds the excitation fiber 300B and collection fiber sub-assembly (here alternatively illustrated with seven collection fibers) 400, which is situated within 16 ga SS tube 58.

Figure 5A:
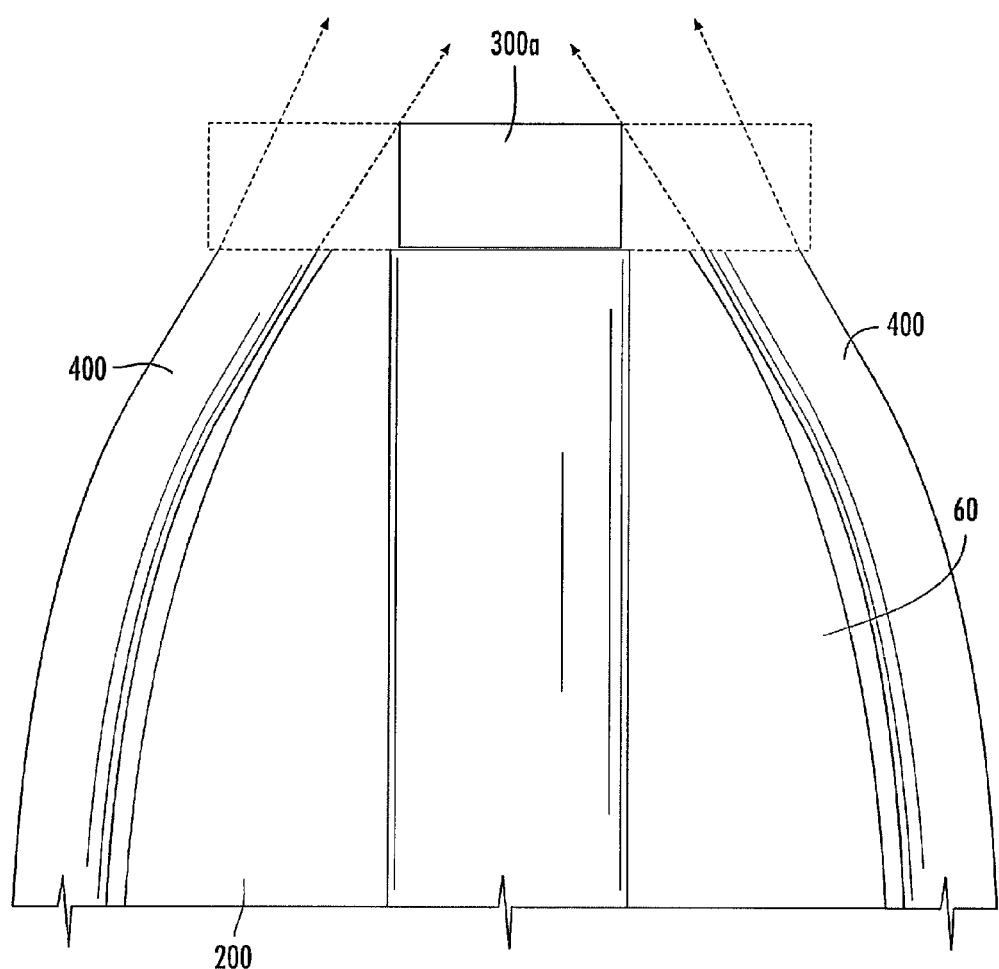
FIG. 5A illustrates a cross-sectional view of an alternative construction wherein the collection elements follow a shaped machined tip.

With reference to FIG. 5A, this embodiment illustrates a cross-sectional view of an alternative construction wherein the collection fibers 400 follow a shaped machined tip 60. In such an embodiment the machined tip could be a machined needle tube itself, so that the collection fibers collection region is different than the parallel fiber design. This embodiment enables the user to collect a signal from very close to the excitation laser or delivery fiber 300B.

Figure 5B:
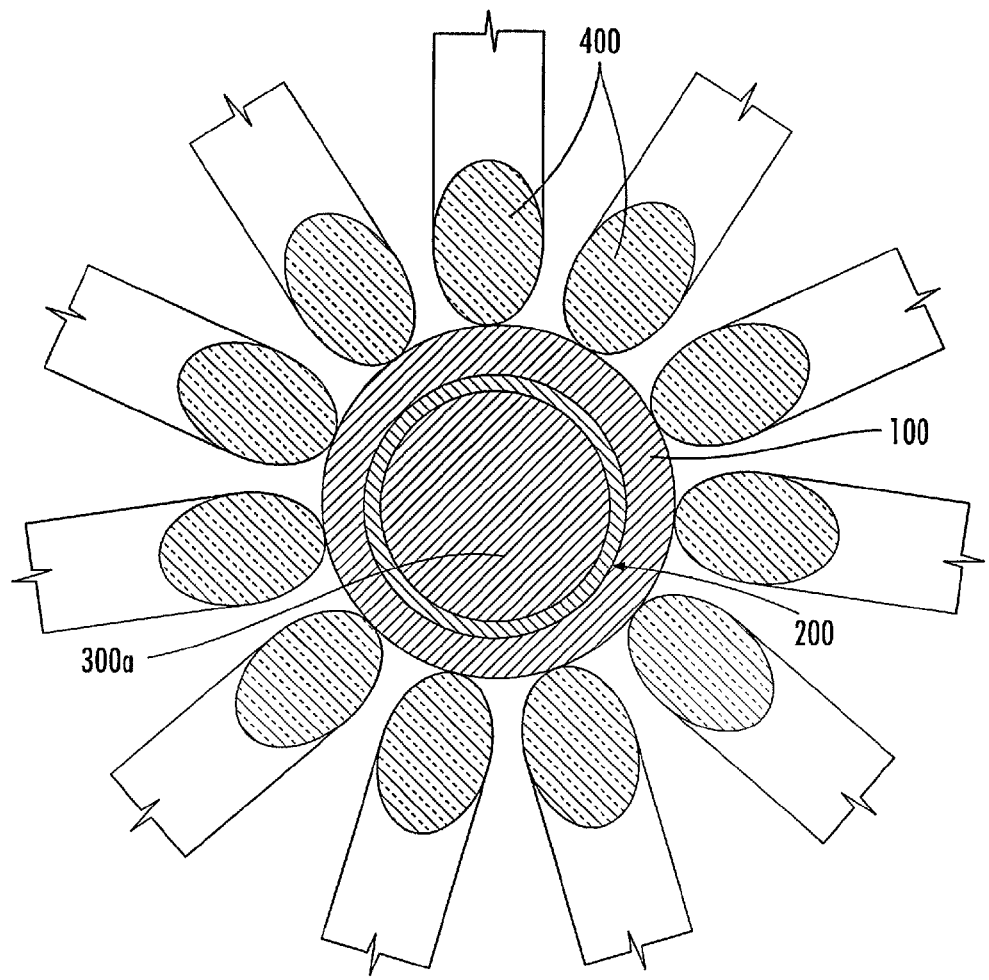
FIG. 5B is an end view of the device visualized in cross-section in FIG. 5A above. This view better illustrates the geometry of the end face of the collection fibers and aids in showing how they become ovoid in shape, since they follow the curvature which the machined tip follows.

Referring now to FIG. 5B, this is an end view of the device visualized in cross-section in FIG. 5A above. This view better illustrates the geometry of the end face of the collection fibers 400 and aids in showing how they become ovoid in shape, since they follow the curvature which the machined tip 60 follows.

Figure 5C:
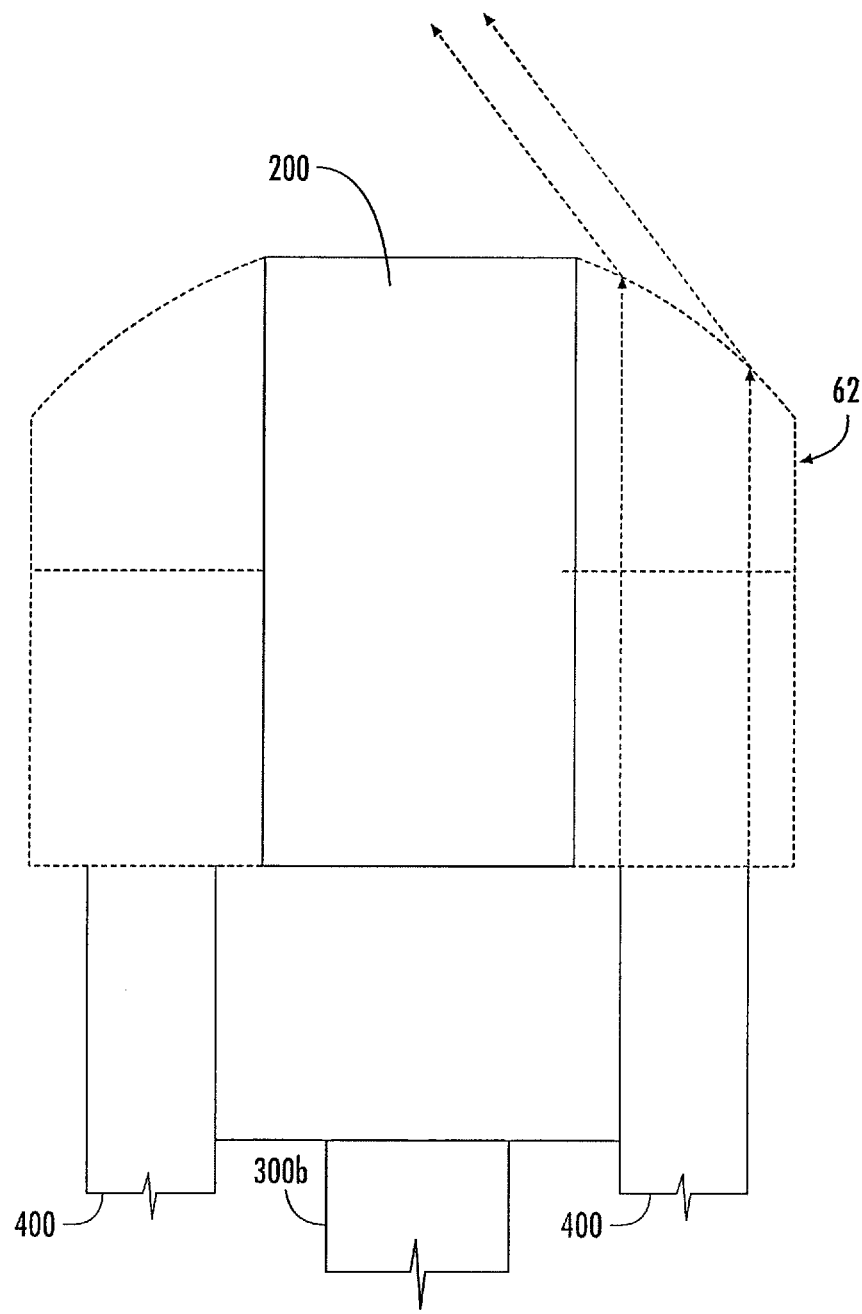
FIG. 5C represents an alternative embodiment which uses a lens or other optical device to alter the way the light is collected or altered.

With reference to FIG. 5C, this represents an alternative embodiment which uses a lens or other optical device 62 to alter the way the light is collected or altered. This could be any standard lens or a GRIN (gradient index) Lens. There could also be more than one lens (a set of lenses). All of these designs incorporate a tube which allows for a fiber assembly to pass through. A top cover glass could also be added to the design if desired.

Front-Lensed Embodiments:

The front (distal)-lensed embodiments allow for better illumination and collection overlap at the desired sample penetration. For example, adding the front (distal) lens allows contact measurements from the sample material directly at the sample surface rather than deeper into the material as in the non-lensed embodiments. The front lens can be designed or selected to alter where the probe gathers the information. The front lens of these embodiments may be constructed of one material or multiple materials. In addition, the lens may be designed (or selected) to minimize or eliminate potential interference (such as Raman spectra or fluorescence) generated from the lens material itself. If the excitation and collection paths intersect partially within the front lens, spectra from the lens material will be collected which is often undesirable. By constructing a multiple component front lens window assembly, each component can be selected for application-specific requirements.

Figure 9:
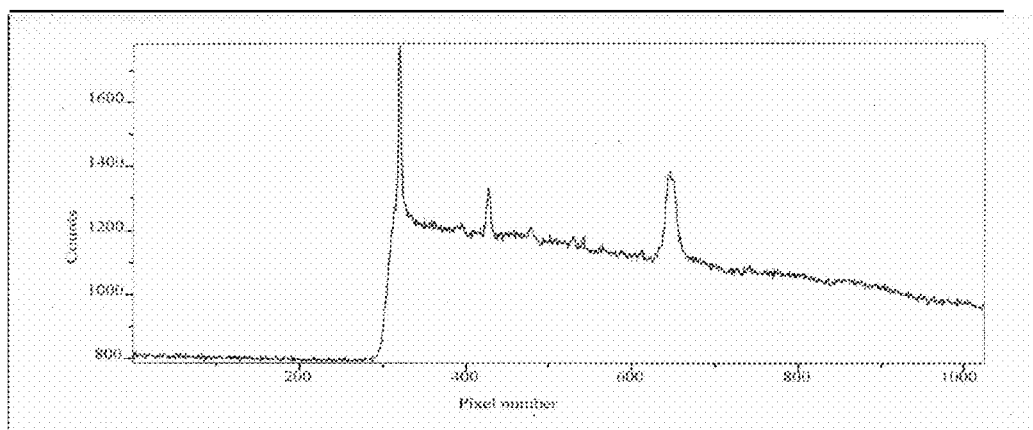
FIG. 9 shows the spectra of air using sapphire lenses.
Figure 10:
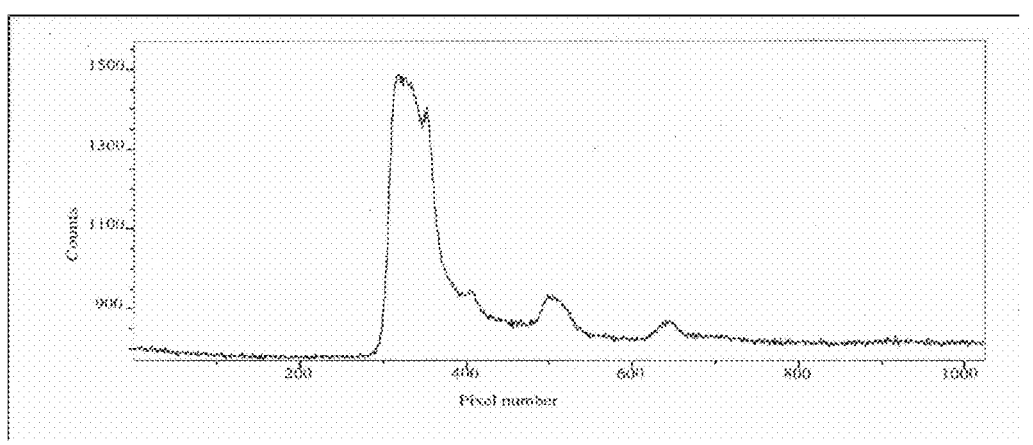
FIG. 10 shows the spectra of air for a sapphire-silica composite front lens and window.

The two-component front lens with window (600) configuration is advantageous in that it provides for more flexibility in the design and applications of the probe. In the first front-lensed embodiment (FIG. 6), a 2 mm (0.079") sapphire ball lens which is polished to 0.46 mm, 0.018" thick and anti-reflective (AR) coated on the curved surface is used as component 600a. Sapphires' high refractive index gives excellent bending of the light (other materials may also be used). Then a 1 mm thick, 1.68 mm, 0.066" fused silica window (600b) is attached to the sapphire with an optical epoxy. The Raman spectra signature of the sapphire is not collected (illustrated in Zemax ray trace diagram of FIG. 8). The probe only collects the Raman spectra of the front window as illustrated in FIGS. 9 and 10. Other (600b) window materials (calcium fluoride CaF2, magnesium fluoride MgF2 are examples) may also be used for desired applications. This allows lenses to be manufactured that use materials which would in the absence of the present design be undesirable from a spectroscopic perspective (especially when the peaks of the material overlap with that of the sample), but could be very desirable from a light bending, cost and/or other perspective. Also, since it is the curved surface and refractive index material of the lens that causes the light bending, the window material has less of an effect on the light path after this bending has occurred. This provides all the optical/spectroscopic advantages for one material and eliminating or minimizing the optical/spectroscopic disadvantages of that material. This situation differs from that with an achromat lens which uses multiple materials to limit the effects of chromatic and spherical aberrations.

Figure 6:
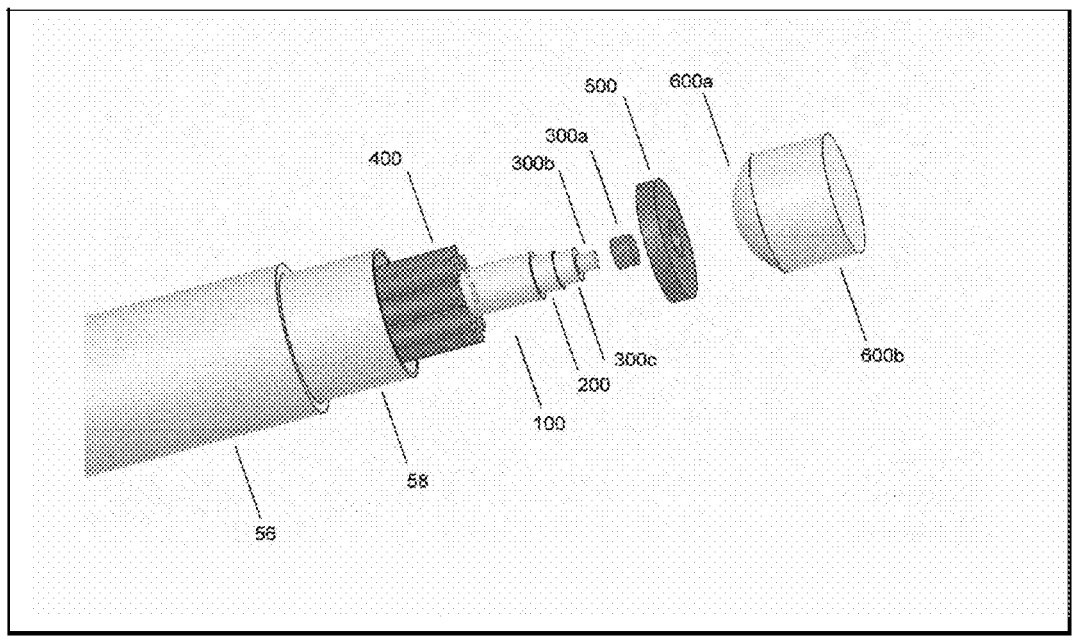
FIG. 6 shows an exploded view of a bundle fiber probe embodiment having a front (distal) lens.

FIG. 6 shows an exploded view of a first front-lensed embodiment, which is a bundle fiber probe having a front (distal) lens. The construction of this embodiment is largely identical to that of the non-front lensed embodiment up to the end of paragraph no. 61 herein where a 16 ga extra thin wall (xtw) tube (58) approximately 12.7 mm, 0.5" long is placed over the polished fiber bundle with epoxy. This 16 ga tube is just slightly recessed from the polished fiber end faces. Then the procedure is the same until paragraph no. 64 where the 14 ga xtw needle tube is placed over the tip. To attach the composite lens-window assembly 600 (consisting of plano convex lens element 600*a* and attached window element 600*b*, the lens-window assembly is placed in a 14 ga thin wall (TW) needle tube (56) approximately 12.7 mm, 0.5" long which has been centerlessly ground to a 1.8 mm, 0.071" outer diameter. Lens-window assembly 600 is placed with its flat surface flush with the end of the tube with any clear optical epoxy. After lens-window assembly is cured in the tube, it is placed over the tip of the probe by sliding over the 16 ga xtw tube until the lens-window assembly touches the flat surface of the probe. Epoxy is placed between the 14 ga TW tube which was centerlessly ground and the 16 ga xtw tube with care taken to avoid getting epoxy on the curved surface of the lens). The final 14 ga XTW tube can then be placed over the probe in the same manner as described herein for the non-front-lensed embodiments.

Figure 7A:
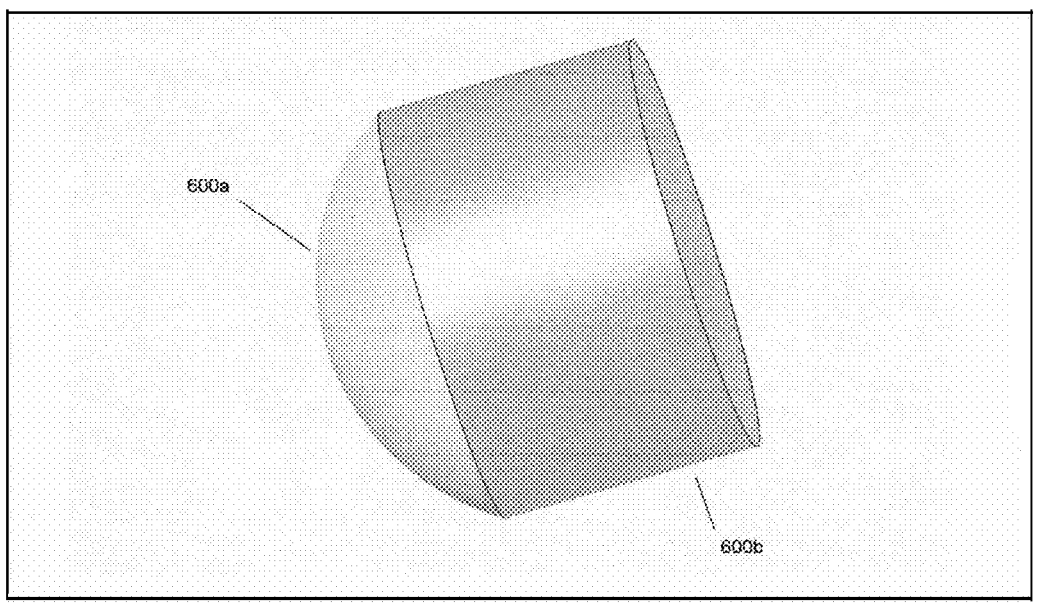
FIG. 7A shows an example of a front distal lens.

FIG. 7A shows an example of a front (distal) lens with attached window that may be used in a front-lensed probe embodiment. The converging lens shown is a single convex lens (a convex surface side and a flat surface side; a plano convex lens) 600*a*, which is a 2 mm, 0.079" sapphire ball lens polished to 0.46 mm, 0.018" thick (representing a section of the original ball lens) and is AR coated on the curved surface. Window 600*b* is a cylindrical element of material selected to be the best for a particular application; materials may, for example, be fused silica, sapphire, Calcium fluoride, Magnesium fluoride etc. In the case (not shown) where a single material is used, a unitary front lens having a convex lens portion and a window portion (like 600*b*) could be selected or machined.

To construct the lens with attached window, the 2 mm, 0.079" sapphire ball that has been polished to 0.46 mm, 0.018" thick (600*a*) is attached to a 1 mm, 0.039" thick 1.68 mm, 0.066" diameter (600*b*) material (for example, sapphire, fused silica, Calcium fluoride, Magnesium fluoride) that has been core drilled from a flat plate. The thickness of this window portion can be altered for a particular material optical characteristics or depth response desired. Any optically clear epoxy may be used for this attachment.

The invention advantageously permits curved surface lenses, such as conventional curved surface lenses, to be used as the front converging lenses of the optical probe assemblies of the invention. Thus, the converging lenses used may be those that are not GRIN (gradient refractive index) lenses. The use of GRIN lenses as converging lenses in the present invention is disadvantageous or not possible at all since, among other things, GRIN lenses create a high level of interfering background signal, the collection of which would not be avoided in the present design since light in the converging lens is at least substantially not collimated and light from the illumination and collection paths diverge across one another in the window portion of the front lens/lens assembly. In addition, a GRIN lens substituting for the curved lens would need to be longer, further compounding this interference problem. Various GRIN lens and optical probe assembly manufacturing techniques are described in copending U.S. application Ser. No. 13/206,264 filed Aug. 9, 2011 which is incorporated by reference herein in its entirety.

Figure 7B:
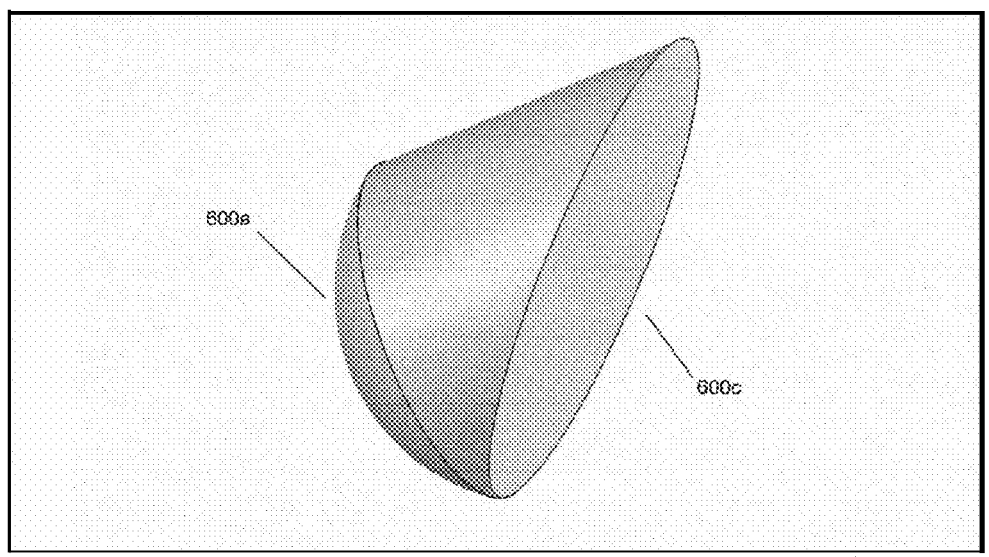
FIG. 7B shows an example of a side-viewing version of front (distal) lens where 600c has a mirror (metallic or dielectric) applied to (or placed on) the angled surface.

FIG. 7B shows an example of a side-viewing version of front distal lens where 600*c* has a mirror (metallic or dielectric) applied (or placed on) to the angled surface. The angle at which 600*c* is polished would be application specific. The angle may, e.g., be 30-degrees, 45-degrees or 60-degrees.

Figure 8:
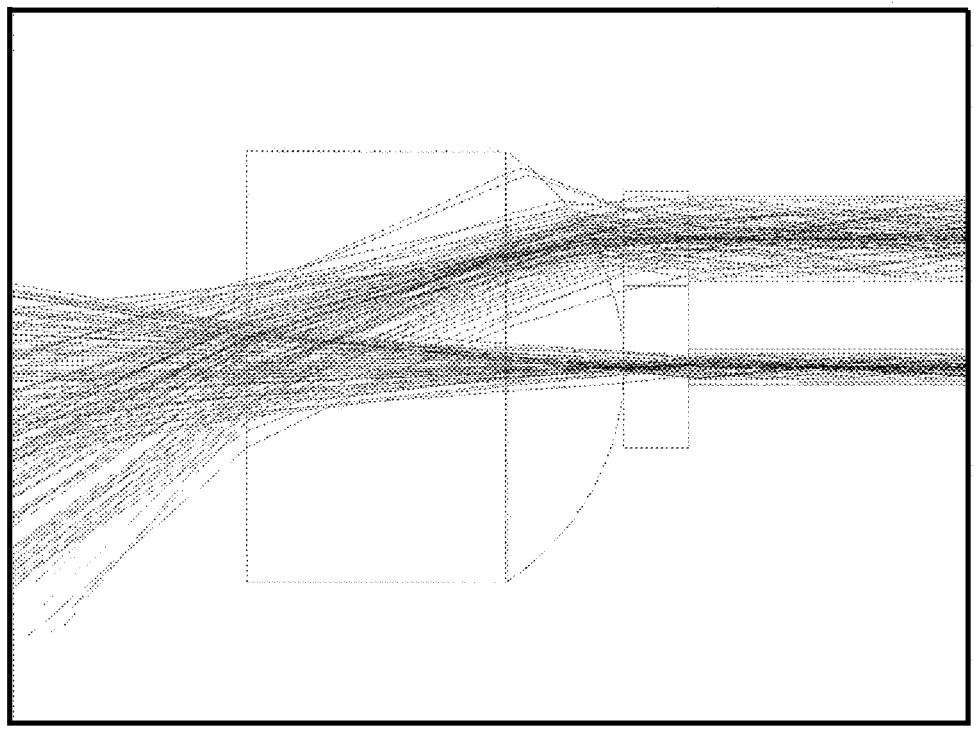
FIG. 8 shows a ray trace diagram of a front (distal)-lensed probe assembly embodiment.

FIG. 8 shows a ray trace diagram produced using Zemax software (Radiant ZEMAX LLC, Bellevue, Wash., USA, ZEMAX-EE) of a front-lensed probe assembly embodiment using a 2 mm, 0.079" sapphire ball lens polished to 0.46 mm, 0.018" thick, and a fused silica 1 mm, 0.039" thick front window. Only one 300-micron core collection fiber is illustrated for ease of viewing the ray tracing. The laser (light delivery) fiber is the center fiber in the figure. This illustrates that the rays do not intersect until in the 1 mm thick window section and not in the 0.46 mm, 0.018" thick curved convex lens section. Thus, for example, a window of material selected for minimal interfering background signal generation (such as silica) may be used since the illumination and collection light paths intersect in the window, while a different material may be used for the converging lens (such as sapphire) where the paths do not intersect. It also illustrates that there is excellent overlap of the rays at the fused silica sample interface. Note that the converging lens touches the end of the filters (to the right of convex surface), so no gap is needed which makes assembly easy and very short compared to other types of lenses.

FIG. 8 also illustrates a general principle of the invention that beyond the distal end of the probe, in this case beyond the distal end of the window element, the intersection of the non-collimated illumination light path and collection light path create a region having a depth from which optical sampling occurs, i.e., the "sampling region." In the embodiment shown, the sampling region begins at the distal surface of the window and proceeds distally until there is substantial divergence of the light paths. The sampling region may be considered the region beyond the probe assembly where there is predominant intersection of the illumination light path (beam) and the collection light path. Thus, with reference to the configuration shown in FIG. 8, it should be apparent that given a particular light delivery optical fiber (diameter, etc.) and collection optical fiber (diameter, etc.) and their radial dispositions with respect to the central axis of the converging lens, and a particular window if present, a converging lens can be selected with a particular focal length to obtain a probe with a sampling region (region where the light delivery path and light collection path substantially overlap beyond the distal sampling end of the probe) can be obtained. For example, the components may be mutually sized and configured to provide a contact probe that samples a layer of a sample just beyond the distal end of the probe to a certain depth, for example within 200 microns of the distal sampling end of the probe assembly. Thus, the sampling region could be around 200 microns deep beginning at the distal surface of the optical window. In a different example, the sampling region could be around 100 microns deep beginning at 100 microns distally beyond the distal surface of the optical window, thus sampling a region around 100-200 microns in depth within a sample. Ray trace diagram software such as the Zemax software may be routinely used to design particularly configured front-lensed embodiments of the invention having desired or predetermined sampling regions and depths thereof. Thus, the front-lensed probe embodiments may be configured (their components mutually configured) to provide predetermined sampling regions with respect to the distal sampling end of the probe assembly, such as sampling regions of predetermined depths that begin at predetermined distances from the distal sampling end of the probe assembly.

Using a 2 mm, 0.079" diameter ball lens rather than the described lens (600) results in larger spectral features arising from the lens material, since the path length overlap is longer for this lens design compared to that of the converging lens of the first front-lensed embodiment.

FIG. 9 shows the spectra of air using a sapphire composite front lens-window element, both 600*a* and 600*b* being sapphire, 1 second acquisition time, 25 mw 785 nm laser power at sample. This shows the residual spectra of the sapphire obtained when a different window material is not used.

FIG. 10 shows the spectra of air obtained using a sapphire 600a-silica 600b lens-window assembly, 1 second acquisition time, 25 mw 785 nm laser power at sample. This shows only a silica Raman residual spectra with no contribution from the sapphire.

Figure 11:
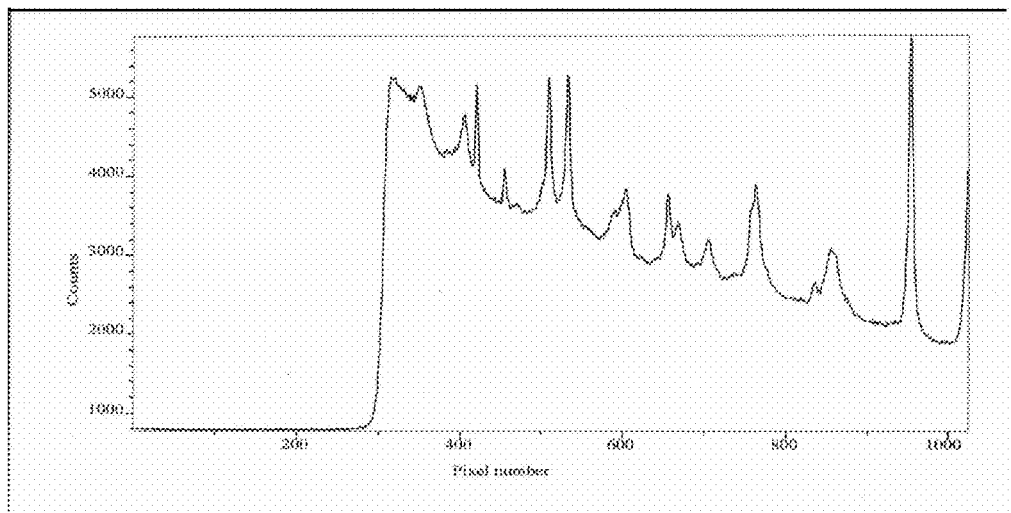
FIG. 11 shows the spectra obtained from a 170 micron thick polyethylene terapthalate (PET) on acrylic backing sample using a probe embodiment having a sapphire-silica composite front lens and window.

FIG. 11 shows the spectra obtaining from a 170 micron thick polyethylene terephthalate (PET) on acrylic sample using the sapphire-silica front lens embodiment probe, 1 second acquisition time, 25 mw 785 nm laser power at sample. The probe directly faces the PET surface in the test. The largest peak at approximately 950 pixels is due to the PET. The overall performance of this embodiment is improved significantly compared to the non-lensed version.

The test sample was designed to mimic tissue and test the depth specificity of the front-lensed and non-front-lensed probe designs of the invention. In medical applications gathering data from the first 200 micron can be very important. The probe may also be of a small diameter to allow for endoscopic and catheter-based applications. The sample was made using frosted, translucent polyethylene terephthalate (PET) to simulate scattering which would occur in biological tissue. More specifically, the test sample was a 170 micron thick frosted (translucent) PET polymer sheet adhered to a 3 mm thick clear acrylic block. The adhesive used to adhere the two materials was an acrylic based UV curable adhesive (Loctite 3106).

Figure 12:
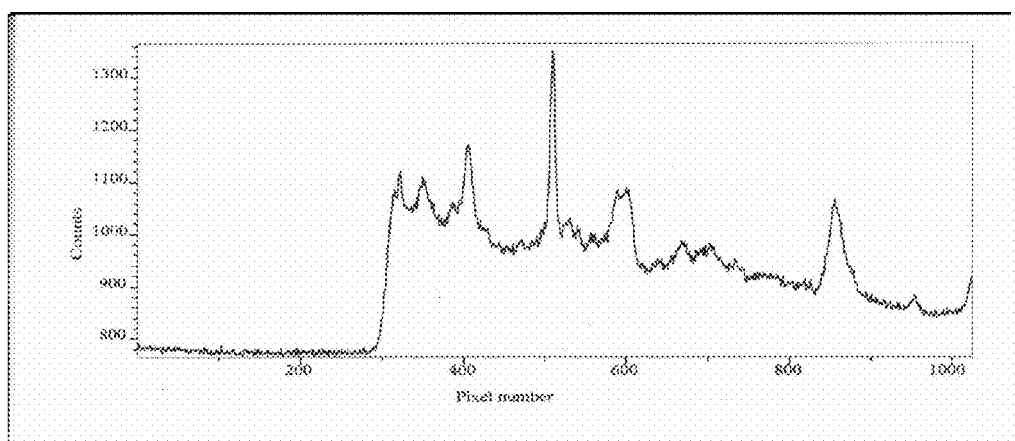
FIG. 12 shows the spectra obtained from a 170 micron thick PET on acrylic backing sample using a similar probe with no front lens.

FIG. 12 shows the spectra obtaining from a 170 micron thick PET on acrylic sample using a corresponding test probe having no front lens and 1 second acquisition time, 25 mw 785 nm laser power at sample. The probe directly faces the PET surface in the test. The obtained spectra is essentially all from the acrylic layer of the sample. This embodiment does not gather spectra efficiently from the 170 micron thick PET material as evident from the small peak at approximately 950 pixels.

Figure 13:
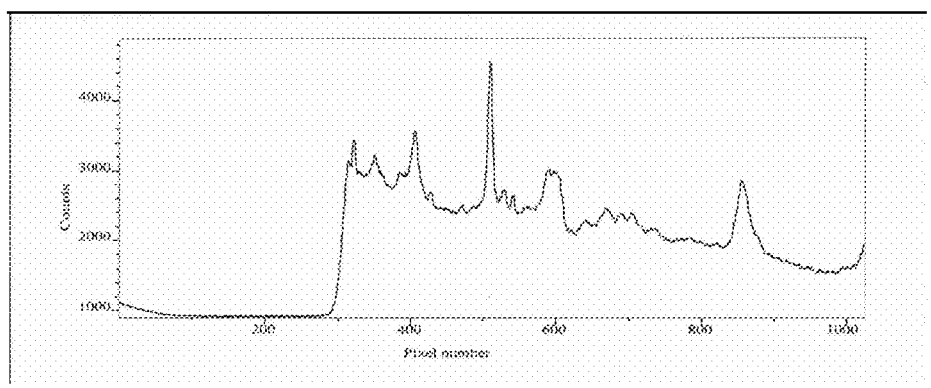
FIG. 13 shows the reference spectra for acrylic only.

FIG. 13 shows the reference spectra for acrylic only.

Figure 14:
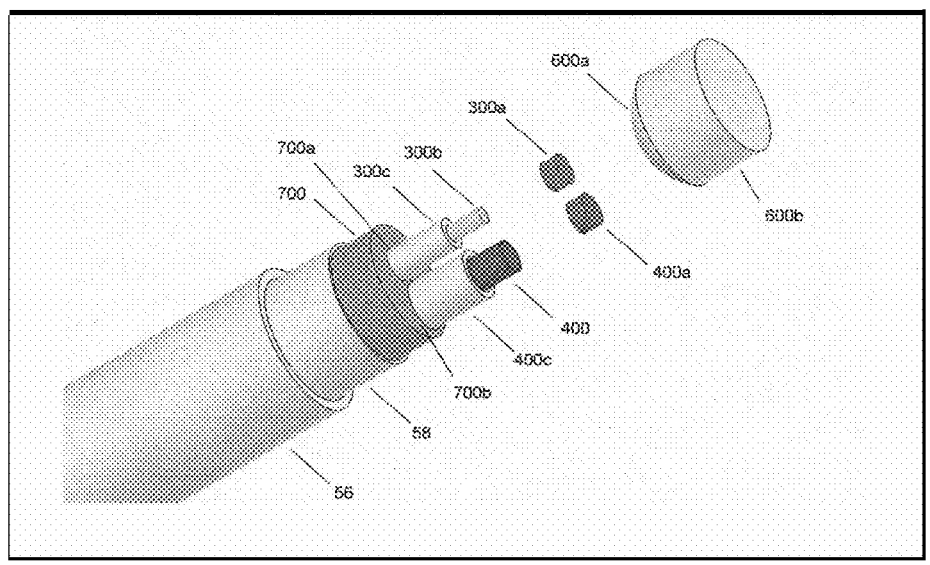
FIG. 14 shows another front-lensed probe embodiment using a rod with holes drilled therein to chamber the optical fibers rather than surrounding the fibers with individual needle tubes.

FIG. 14 shows another front-lensed probe embodiment using a rod with holes drilled therein to chamber the optical fibers (e.g., in the manner of a revolver barrel) rather than surrounding the fibers with individual needle tubes as in the first front-lensed embodiment. The embodiment utilizes holes drilled in a rod which replaces the needle tubes (100, 200) with holes (700a, b) drilled in a short rod (700). The fiber (300b, 400) with tube (300c, 400c) around it has the filter (300a, 400a) placed on this polished surface in the same fashion as for the first front-lensed embodiment and the filter is flush with the distal end of the drilled rod or slightly recessed. The chamber wall surrounding the hole drilled in the rod provides optical isolation (that would be provided by tube 200 in the first front-lensed embodiment). The rod may, for example, be metallic such as brass. There is no need for a donut filter (500) in this embodiment since the collection fibers do not surround the laser fiber in this design. The collection fiber (s) may have a long-pass or notch filter placed, in the same fashion as a laser bandpass or shortpass filter can be placed on the light delivery fiber, such as for Raman spectroscopy. Only two fibers/holes are illustrated for clarity but more may be used. A multiple fiber per hole configuration may also be used for one or more, such as all, of the holes, and combinations of multiple fiber per hole and single fiber per hole configurations may also be used in the same probe assembly. This type of design could be particularly useful for a multiple spectroscopic technique probe (Raman spectroscopy, diffuse reflectance, fluorescence, etc. For example, multiple holes, each a fiber path, could be used for individual fiber(s) each dedicated to a different spectroscopic technique. In one variation, a central hole is used for a light/laser delivery optical fiber with surrounding (radially peripheral) holes used for light collection in a configuration similar to that shown in FIG. 6. If used for diffuse reflectance spectroscopy, no tube 300c or 400c would be needed and the fiber could be inserted into a properly sized hole to accept the fiber; also a filter (300a, 300b) would not be needed for this spectroscopic technique. The manufacturing techniques for this embodiment may largely be the same as those described for the first front-lensed embodiment, e.g., polishing the collection fiber (s) when placed in the drilled rod (chambered barrel), polishing then inserting the illumination fiber afterwards, etc.

In addition to the specific front-lensed embodiments described above, the invention provides corresponding front-lensed embodiments of any of the non-front-lensed embodiments and variations thereof described herein. This includes, for example, adding a front (distal) converging lens as described herein with or without a distal window to any of the non-front-lensed embodiments and variations thereof described herein.

It should be readily understood from the examples provided herein that, unless otherwise specified, the proximal-distal orientations of all the components or parts thereof described are consistently codirectional in the various subassemblies, assemblies and finished probes and are not opposite each other. It should also be understood that various components of the probe assembly embodiments of the invention, as shown in the accompanying figures, are adjacent to each other and not remote from each other. Any of the optical surfaces of components of probe assemblies of the invention may be coated with anti-reflective (AR) coatings, as desired.

By "footprint," what is meant herein is the meaning commonly understood in the art, i.e., the projection of the outer transverse dimension (that encompassed by a perimeter, such as the projection of an outer diameter) of a subject structure or face thereof, along its longitudinal axis in both directions such that something within the footprint could for example be falling within the footprint behind (proximal to) the proximal end/face of the structure or could be physically disposed within the actual outer transverse dimension of the structure, i.e., within the body of the structure. Various embodiments shown in the figures and described herein have been exemplified with optical components, such as lenses, optical fibers and various tubes, having a circular transverse dimension (circular as to the perimeter of the cross-section). However, any of the various embodiments of the invention can be similarly implemented with components having different transverse dimension shapes, such as oval, polygonal, square, rectangular etc., alone or in combination with each other and/or circular cross-section components.

The invention further provides spectroscopy apparatuses that include: any of the probe embodiments, versions and variations thereof described herein; a light analyzer optically linked to the at least one collection optical fiber of the probe; and a light source optically linked to the at least one delivery optical fiber of the probe assembly. The light analyzer may, for example, be selected from the group consisting of a light detector, a spectrometer such as but not limited to a Raman spectrometer, and an interferometer. The light source may, for example, be a laser or a non-coherent light source depending on the type(s) of spectroscopy which it is desired to practice. The apparatus may further include at least one computer including at least one computer processor and computer accessible memory comprising computer instructions for controlling the at least one light source and/or at least one light detector/analyzer and/or for recording and/or analyzing data from the at least one light analyzer, said computer being operably linked to the at least one light source and/or at least one light detector/analyzer, for example, as commonly known in the art. The computer may further include at least one user input device such as a keyboard and/or at least one user output device for example a display and/or a printer.

Apparatuses according to the invention may, for example, be configured to perform one or more of: Raman spectroscopy, such as finger print Raman spectroscopy and/or high-wavenumber Raman spectroscopy, diffuse reflectance spectroscopy, specular reflectance spectroscopy, fluorescence spectroscopy such as time-resolved fluorescence spectroscopy and UV fluorescence spectroscopy, infrared spectroscopy, laser-induced breakdown spectroscopy (LIBS) and optical coherence tomography (OCT).

All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A fiber optic probe assembly having a distal sampling end, a proximal end, a light delivery path therethrough and a light collection path therethrough, said probe comprising:
    (a) a converging lens disposed at or near the distal sampling end of the probe, said converging lens having a distal end, a proximal end, a central axis, a length, a transverse dimension and a focal length;
    (b) at least one collection optical fiber having a distal end, a proximal end, a central axis and a transverse dimension,
    the proximal end of the converging lens in optical communication with the distal end of the at least one collection optical fiber,
    the central axis of the at least one collection optical fiber at its distal end being parallel to the central axis of the converging lens, and
    the transverse dimension of the at least one collection optical fiber at its distal end being within the footprint of the converging lens; and
    (c) at least one light delivery optical fiber having a distal end, a proximal end, a central axis, and a transverse dimension, its central axis at its distal end being parallel to the central axis of the converging lens and its transverse dimension at its distal end being within the footprint of the converging lens, wherein the proximal-distal orientation of the converging lens,
    wherein the proximal-distal orientation of the converging lens, the at least one collection optical fiber, the light delivery optical fiber, and the probe assembly are co-directional,
    wherein the collection optical fiber and the light delivery optical fiber are disposed in a side-by-side relationship at their distal ends,
    wherein the converging lens, the at least one collection optical fiber, and the at least one light delivery optical fiber are mutually sized and configured such that the light delivery path and the light collection path at least substantially do not intersect in the converging lens,
    wherein the converging lens, the at least one collection optical fiber, and the at least one light delivery optical fiber are mutually configured such that the light delivery path and the light collection path are intersecting distally beyond the distal end of the probe assembly, and
    wherein the converging lens is a single convex lens having a convex face and a flat face, the single convex lens orientated in the assembly such that its convex face is in optical communication with and faces the distal ends of the light delivery optical fiber and the light collection optical fiber and the flat face of the single convex lens faces in the distal direction.

2. The assembly of claim 1, wherein the convex face of the converging lens is juxtaposed with the distal ends of the light delivery optical fiber and the light collection optical fiber.

3. The assembly of claim 1, further comprising an alignment barrel having a proximal end and a distal end, a longitudinal dimension, a transverse dimension, and at least two longitudinal holes having parallel central axes passing therethrough,
    wherein the distal end portion of at least one light collection optical fiber is disposed within one of the longitudinal holes,
    wherein the distal end portion of at least one light delivery optical fiber is disposed within one of the longitudinal holes, and
    wherein the central axes of the distal portions of the light collection optical fiber and the light delivery optical fiber are parallel to the central axes of the longitudinal holes in which they are disposed.

4. The assembly of claim 1, further comprising:
    at least one filter selected from the group consisting of a filter disposed between the distal end of at least one light delivery optical fiber and the converging lens; and a filter disposed between the distal end of at least one light collection optical fiber and the converging lens.

5. The assembly of claim 4, comprising:
    a bandpass or shortpass filter disposed between the distal end of at least one light delivery optical fiber and the converging lens; and
    a longpass or notch filter disposed between the distal end of at least one light collection optical fiber and the converging lens.

6. The assembly of claim 1, further comprising an optical window having a proximal end face, a distal end face and a length, the proximal end face of the optical window in optical communication with the distal end of the converging lens.

7. The assembly of claim 6, wherein the length of the optical window is greater than the length of the converging lens.

8. The assembly of claim 6, wherein the optical window is composed of a different material than the converging lens.

9. The assembly of claim 8, wherein the length of the optical window is greater than the length of the converging lens.

10. The assembly of claim 6, wherein the light delivery path and light collection path are at least substantially intersecting within 200 microns beyond the optical window.

11. The assembly of claim 6, wherein the optical window is cylindrical.

12. The assembly of claim 1, wherein the light delivery path and light collection path are at least substantially intersecting within 200 microns beyond the distal sampling end of the assembly.

13. The assembly of claim 1, wherein there is no optical window and the light delivery path and light collection path are at least substantially intersecting within 200 microns beyond the distal surface of the converging lens.

14. An optical analysis apparatus, comprising:
an optical probe assembly according to claim 1;
at least one light analyzer optically coupled to the proximal end of the light collection optical fiber; and
at least one light source optically coupled to the proximal end of the light delivery optical fiber.

15. The optical analysis apparatus of claim 14, wherein the at least one light analyzer comprises a Raman spectrometer and the light source comprises a laser.

16. The optical analysis apparatus of claim 14, configured to perform more than one spectroscopic technique using the probe assembly.

17. A fiber optic probe assembly having a distal sampling end, a proximal end, a light delivery path therethrough and a light collection path therethrough, said probe comprising:
(a) a plano-convex converging lens formed of a first optical material and disposed at or near the distal sampling end of the probe, said converging lens having a distal end, a curved proximal end, a central axis, a length, a transverse dimension and a focal length;
(b) at least one collection optical fiber having a distal end, a proximal end, a central axis and a transverse dimension,
the proximal end of the converging lens in optical communication with the distal end of the at least one collection optical fiber,
the central axis of the at least one collection optical fiber at its distal end being parallel to the central axis of the converging lens, and
the transverse dimension of the at least one collection optical fiber at its distal end being within the footprint of the converging lens;
(c) at least one light delivery optical fiber having a distal end, a proximal end, a central axis and a transverse dimension, its central axis at its distal end being parallel to the central axis of the converging lens and its transverse dimension at its distal end being within the footprint of the converging lens; and
(d) an optical window formed of an optical material different than the first optical material, the optical window having a proximal end face, a distal end face and a length, the proximal end face of the optical window in juxtaposed relationship with the distal end of the converging lens and the length of the optical window greater than the length of the converging lens,
wherein the proximal-distal orientation of the converging lens, the at least one collection optical fiber, the light delivery optical fiber, the probe assembly and optical window are codirectional,
wherein the collection optical fiber and the light delivery optical fiber are disposed in a side-by-side relationship at their distal ends,
wherein the converging lens, the at least one collection optical fiber, and the at least one light delivery optical fiber are mutually sized and configured such that the light delivery path and the light collection path at least substantially do no intersect in the converging lens; and
wherein the converging lens, the at least one collection optical fiber, the at least one light delivery optical fiber, and the optical window are mutually configured such that the light delivery path and light collection path are intersecting distally beyond the distal end of the optical window.

18. The assembly of claim 17, further comprising an alignment barrel having a proximal end and a distal end, a longitudinal dimension, a transverse dimension, and at least two longitudinal holes having parallel central axes passing therethrough,
wherein the distal end portion of at least one light collection optical fiber is disposed within one of the longitudinal holes,
wherein the distal end portion of at least one light delivery optical fiber is disposed within one of the longitudinal holes, and
wherein the central axes of the distal portions of the light collection optical fiber and the light delivery optical fiber are parallel to the central axes of the longitudinal holes in which they are disposed.

19. The assembly of claim 17, wherein the light delivery path and light collection path are at least substantially intersecting within 200 microns beyond the optical window.

20. The assembly of claim 17, further comprising:
a bandpass or shortpass filter disposed between the distal end of at least one light delivery optical fiber and the converging lens; and
a longpass or notch filter disposed between the distal end of at least one light collection optical fiber and the converging lens.

* * * * *

UNITED STATES PATENT AND TRADEMARK OFFICE
CERTIFICATE OF CORRECTION

PATENT NO. : 8,702,321 B2
APPLICATION NO. : 13/465847
DATED : April 22, 2014
INVENTOR(S) : Eric T. Marple et al.

It is certified that error appears in the above-identified patent and that said Letters Patent is hereby corrected as shown below:

In the Claims

Column 18, lines 4-5, delete "wherein the proximal-distal orientation of the converging lens,".

Column 18, line 25, "orientated" should read -- oriented --.

Column 18, line 51, delete ";".

Column 20, line 21, "no" should read -- not --.

Signed and Sealed this
Twenty-ninth Day of July, 2014

Michelle K. Lee
*Deputy Director of the United States Patent and Trademark Office*